United States Patent Office 2,925,956
Patented Feb. 23, 1960

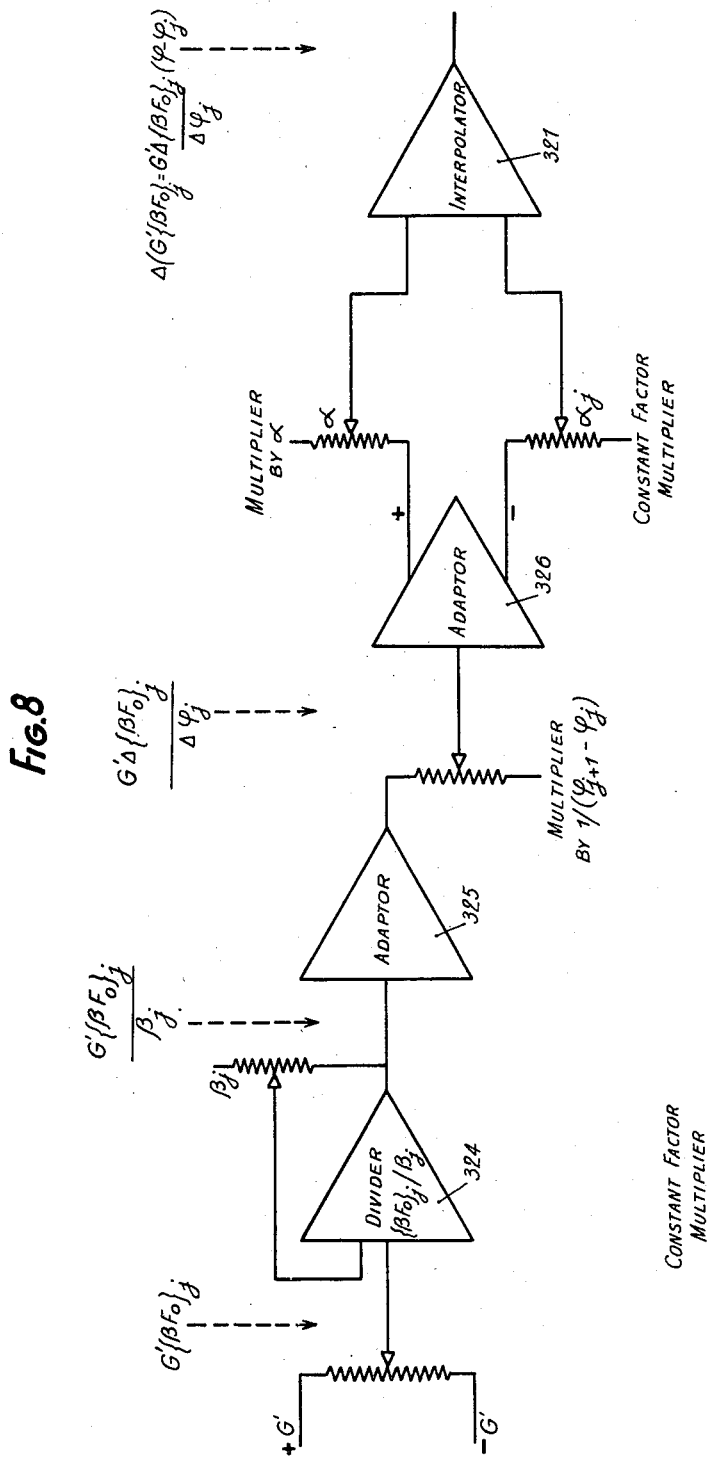

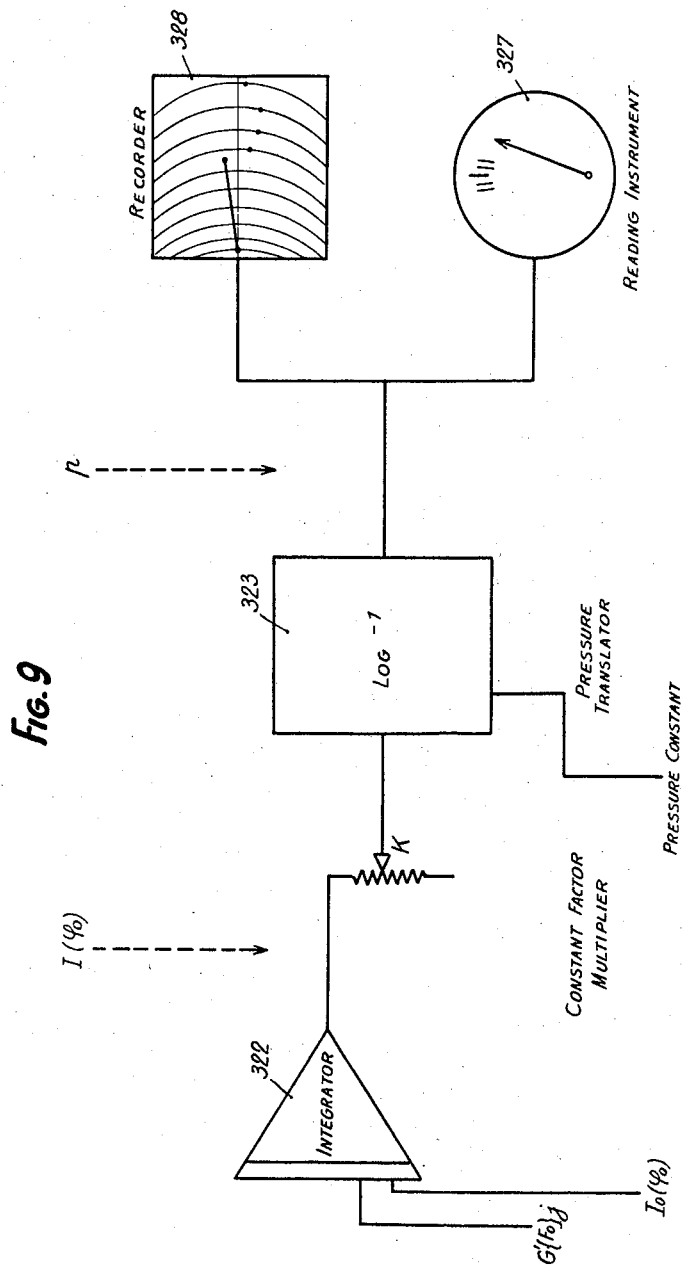

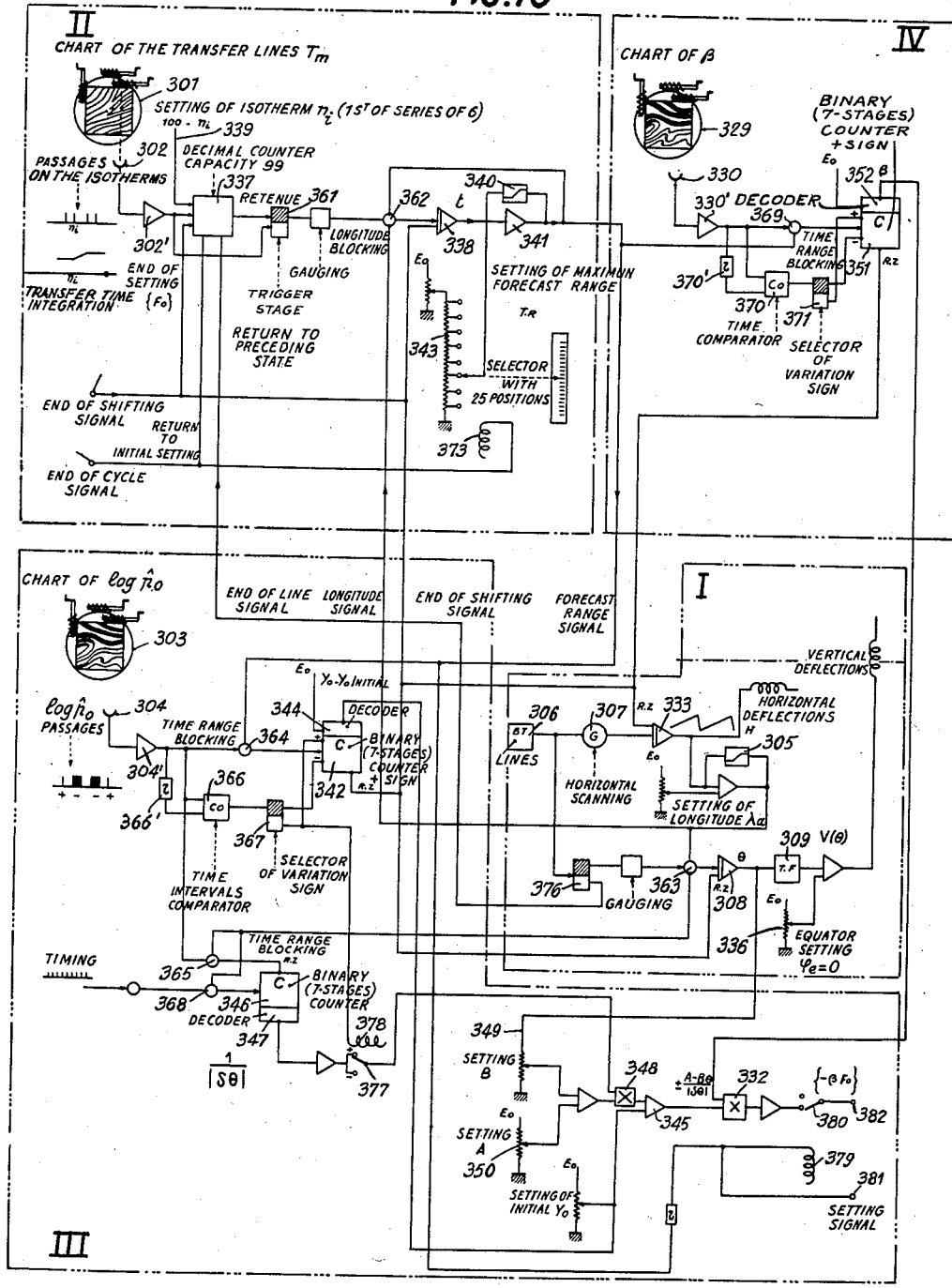

2,925,956

APPARATUS FOR CALCULATING A MATHEMATICAL FUNCTION THROUGH ELECTRICAL MEANS

Antonio Gião, Paris, and Francois Henri Raymond, Le Vesinet, France

Application August 4, 1953, Serial No. 372,364

Claims priority, application France October 22, 1952

25 Claims. (Cl. 235—61.6)

It is the object of the present invention to provide a method of, and an apparatus for, effecting quickly automatically, continuously and simultaneously the two following mathematical operations: (I) the transfer of a function $f_0$ (defined on regular surface) along the streamlines of a transfer velocity vector $\vec{H}_\sigma$ independent of time, tangent to the surface but likely to vary from one point to another thereof; (II) the integration, along one line of the aforesaid surface and between two arbitrary limits, of the variable values of the transferred function $\{f_0\}$ multiplied contingently by a so-called weight function G, this operation taking place compulsorily during the transfer operation.

The two above-defined operations are of considerable interest for the solution of certain problems of geophysics and more particularly for solving the following equation:

(1) $$\frac{\partial p}{\partial t} = -\vec{H}_\sigma \cdot \nabla_h p + \vec{\Lambda} \cdot \nabla_h \left(\frac{\partial p}{\partial t}\right)$$

in which $p$ = unknown space and time function to be determined;
$t$ = time;
$\vec{H}_\sigma$ = transfer velocity mentioned hereinabove;
$\vec{\Lambda}$ = a vector having the dimensions of a length;
$\Delta_h$ = two-dimensional gradient operator.

This equation may be applied to certain important geophysical phenomena by writing (2) $$\vec{H}_\sigma = \frac{R}{2\Omega \sin \varphi} \vec{k}_z \times \nabla_h T_m$$

(3) $$\vec{\Lambda} = \frac{r}{K} \cotg \varphi \vec{k}_N$$

in which

K = an absolute constant;
$\varphi$ = the geographical latitude;
$\Omega$ = the angular velocity of rotation of the earth;
R = constant of gases for air;
$T_m$ = mean air temperature for a given time period;
$r$ = mean radius of the earth;
$\vec{k}_z$ = unit vector of the ascending verticals;
$\vec{k}_N$ = unit vector of the meridians.

The general solution of Equation 1 may be summarized by the formula (4) $$\log \hat{p}(\varphi_0, \lambda, t) = \int_{\varphi_0}^{\pi/2} G(\varphi, \varphi_0) \frac{1}{\beta} \{\beta F_0\}(\varphi, \lambda, t) d\varphi$$

in which (5) $$G(\varphi, \varphi_0) = K \operatorname{tg} \varphi \frac{(\cos \varphi)^K}{(\cos \varphi_0)^K}$$

(6) $$F_0 = \log \hat{p}_0 - \frac{r}{K} \cotg \varphi \frac{\partial \log \hat{p}_0}{\partial N}$$

with the following symbols:

$\lambda$ = longitude;
N = length measured on the meridians towards north;
$\varphi_0$ = latitude of the point considered;
$\hat{p}_0$ = initial values of function $p$ possibly increased by a constant in order to render this function positive everywhere;
$\beta$ = non-analycity factor of the solution ($0 < \beta \leq 1$);
$\beta F_0$ = function which is to undergo the transfer operation;
$\{\beta F_0\}$ = function $\beta F_0$ after its transfer;
K = absolute constant.

According to another characteristic feature of the present invention the calculating apparatus is so arranged that the fundamental data (that is, the initial function $\hat{p}_0$ or $F_0$ and the predetermined transfer velocity field $\vec{H}_\sigma$) are introduced in the form of graphical representations of level curves and streamlines plotted on a plan, these curves being subjected to an electro-optical scanning, for example.

It is a further feature of the present invention that the level curves of $p_0$ or $F_0$ and the streamlines of $\vec{H}_\sigma$ are plotted on a plan projection of one portion of a spherical surface in orthogonal co-ordinates corresponding to the spherical co-ordinates (latitude and longitude).

There is described hereafter one form of embodiment of the apparatus in question intended for computing pressure variations in terms of time at any desired point.

In this embodiment the apparatus is divided into two distinct elements: one element is used for effecting the integral of Formula 4, that is $$\int_{\varphi_0}^{\pi/2} G(\varphi, \varphi_0) \frac{1}{\beta} \{\beta F_0\} d\varphi$$

assuming that the function $G(\varphi, \varphi_0)$ is given and also a set of values of $\{\beta F_0\} \beta^{-1}$.

The other element is used for determining the values $\{\beta F_0\}$ of the transferred function $\beta F_0$, by means of the graphical representation of the level curves of $F_0$ or $\hat{p}_0$ and of the streamlines of the transfer vector $\vec{H}_\sigma$.

It is another object of the present invention to provide a method of calculating the function $p$ or $\{F_0\}$, and notably of determining $p$ or $\{F_0\}$ at any point of latitude $\varphi_0$ and longitude $\lambda$ at an arbitrary moment $t$ after the initial moment.

In the attached drawings given solely by way of example:

Figure 8 is a diagrammatical representation of another part of the apparatus which is intended to permit the intervention of the non-analyticity factor $\beta$ and showing also the linear interpolator of the values of $\{\beta F_0\} \beta^{-1}$.

Figure 9 shows another portion of the apparatus which is designed to calculate the function $\log \hat{p}$ and the pressure when the latter is to be determined;

Figure 10 shows a substantially more complete diagram of the first part of the apparatus;

Figure 1:
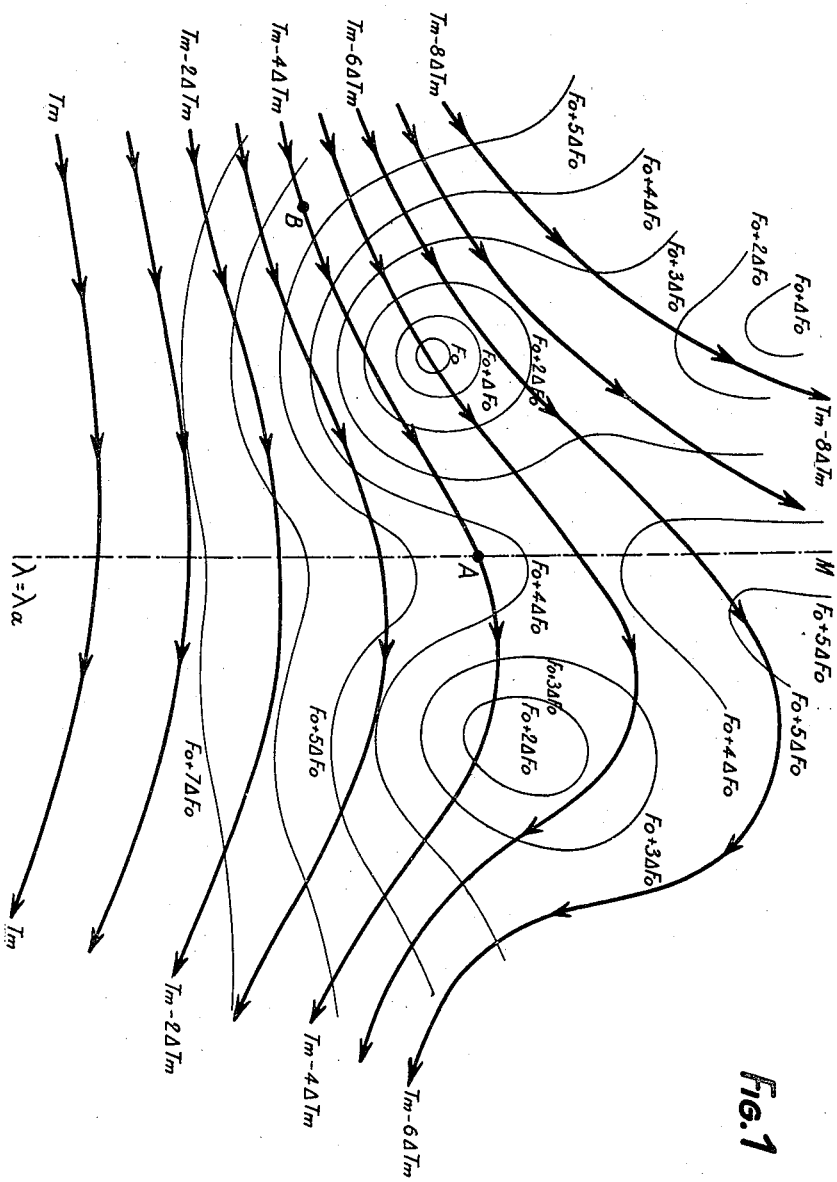
Figure 1 is a diagram illustrating one example of level curves of the function $F_0$ (in thin lines) and one example of streamlines of the transfer vector $\vec{H}$ (in thick lines)
Figure 2:
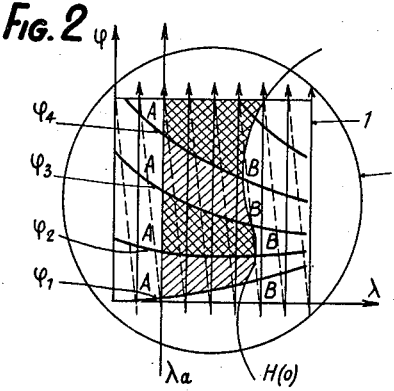
Figures 2 and 3 show in plan projection the streamlines of $\vec{H}_\sigma$ and the level curves of $\beta F_0$, respectively.
Figure 3:
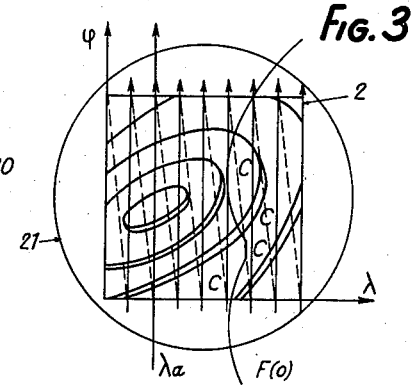

Figures 1, 2 and 3 of the drawings afford a clear illustration of the problem as it occurs in the case considered herein.

In Fig. 1 a group of level lines of $F_0$ and a group of streamlines of $\vec{H}$ are shown, together with a meridian M of longitude $\lambda = \lambda_a$. The problem consists in automatically and continuously operating the transfer of the function $F_0$ or more generally of $\beta F_0$ to any point of the meridian M, due allowance being made for a variable displacement of all the level lines of $F_0$ (or $\beta F_0$) at the velocity $\vec{H}$ along the streamlines of this vector, that is in accordance with the equation $$(7) \qquad \frac{\partial \{\beta F_0\}}{\partial t} = -\vec{H} \cdot \nabla \{\beta F_0\}$$

expressing the fundamental property of the function $\{\beta F_0\}$ resulting from the transfer of $\beta F_0$.

The first part of the apparatus according to the invention is designed as follows and intended to determine the values of the transferred function $\beta F_0$, that is $\{\beta F_0\}_1$, $\{\beta F_0\}_2$; ... $\{\beta F_0\}_n$ for the different streamlines considered, as well as the corresponding values of the variable $\varphi$ along the meridian M ($\lambda = \lambda_a$).

Although the problem contemplated is of a very general character, it will be simplified hereafter by considering the specific case of its application to geophysics alone. It will be assumed therefore that the aforesaid regular surface is that of the geoïd. The graphical illustrations of Figs. 2 and 3 are assumed to be in Mercator projection wherein each point is defined by orthogonal co-ordinates $\varphi$ and $\lambda$ (latitude and longitude).

Fig. 2 shows in thicker lines a group of streamlines of the transfer velocity field $\vec{H}_\sigma$. These streamlines, according to Formula 2 are the isotherms of the field of mean temperature $T_m$ on a geographical area bound by the support 1 (the vertical axis is that of the latitudes $\varphi$ and the horizontal axis that of the longitudes $\lambda$).

Fig. 3 shows in a similar manner, in thick lines, the level lines of the function $\beta F_0$ for the same geographical area, represented here as a support 2. In order to afford an optical discrimination of the sign of variation of $\beta F_0$ for each line of scanning of the diagram along the meridians, the level lines of $\beta F_0$ are traced in double or thick lines wherever $\partial \beta F_0 / \partial \varphi < 0$ and in single lines wherever $\partial \beta F_0 / \partial \varphi Z 0$; of course, this arrangement may be reversed without any inconvenience.

Then, considering a given longitude value—which however can be selected at will, for instance the indicated value $\lambda_a$—the intersections of the vertical straight line $\lambda_a$ with the streamlines of $\vec{H}_\sigma$ (Fig. 2) will define a succession of ordinates $\varphi_1, \varphi_2, \ldots \varphi_n$, at the points A plotted on this Fig. 2.

If a transfer time $t$ (also such that it can be selected at will) is fixed, the path at the velocity $-\vec{H}_\sigma$ of each streamline of Fig. 2 (to the right of this figure) during this transfer time $t$ will determine a series of points such as B, each point B corresponding to a single point A and having as its co-ordinates a given longitude value and a given latitude value.

If both diagrams of Figs. 2 and 3 are considered simultaneously, it will be seen that for each point B of Fig. 2, there is a single corresponding point C of Fig. 3 which is defined by the same co-ordinates of longitude and latitude. Besides, to each point C there corresponds a well-defined value of the function $\beta F_0$.

If these values ($\beta_1 F_1, \beta_2 F_2, \ldots \beta_n F_n$) are transferred to the ordinates $\varphi_1, \varphi_2, \ldots \varphi_n$, of the points A of longitude $\lambda_a$, the desired transfer of the aforesaid function $\beta F_0$ along the streamlines of the velocity field $\vec{H}_\sigma$ will be effected for a time $t$.

The computation of the transfer time $t$ along each streamline of the transfer vector $\vec{H}_\sigma$ and from an arbitrary point can be effected in a simple manner in the important case where the transfer velocity is given by the Formula 2 hereinabove.

Indeed it follows from this formula that $$(8) \qquad t = \frac{2\Omega r}{RE\Delta T_m} \int_A^B |\sin \varphi| \cos^2 \varphi (\Delta N^{-1}) d\lambda$$

in which

A and B are two points of a streamline of $\vec{H}_\sigma$;

$\Delta T_m$ = the constant difference of $T_m$ (in centigrade degrees) corresponding to two successive isotherms;

$\Delta N'$ = the distance between these isotherms (streamlines of $H_\sigma$) as measured on the meridians of the chart;

$\lambda$ = the longitude;

E = the scale (in Mercator projection) at which the field $H_\sigma$ of Fig. 2 is represented.

If we disregard the factor $|\sin \varphi| \cos^2 \varphi$, it will be seen that the transfer time is proportional to the area comprised between the successive streamlines and the meridians of points A and B.

A non-limiting example of a practical embodiment of a computer of this type will be described hereafter, wherein on the one hand the simultaneous scanning of the graphical representations constituting the fundamental data introduced into the computer is effected through electronic means, and on the other hand the recording of the two groups of values $\varphi_1, \varphi_2, \ldots \varphi_n$ and $\beta_1(F_0)_1, \beta_2(F_0)_2, \ldots \beta_n(F_0)_n$ is obtained by setting two sets of sliders on corresponding potentiometric units.

Figure 4:
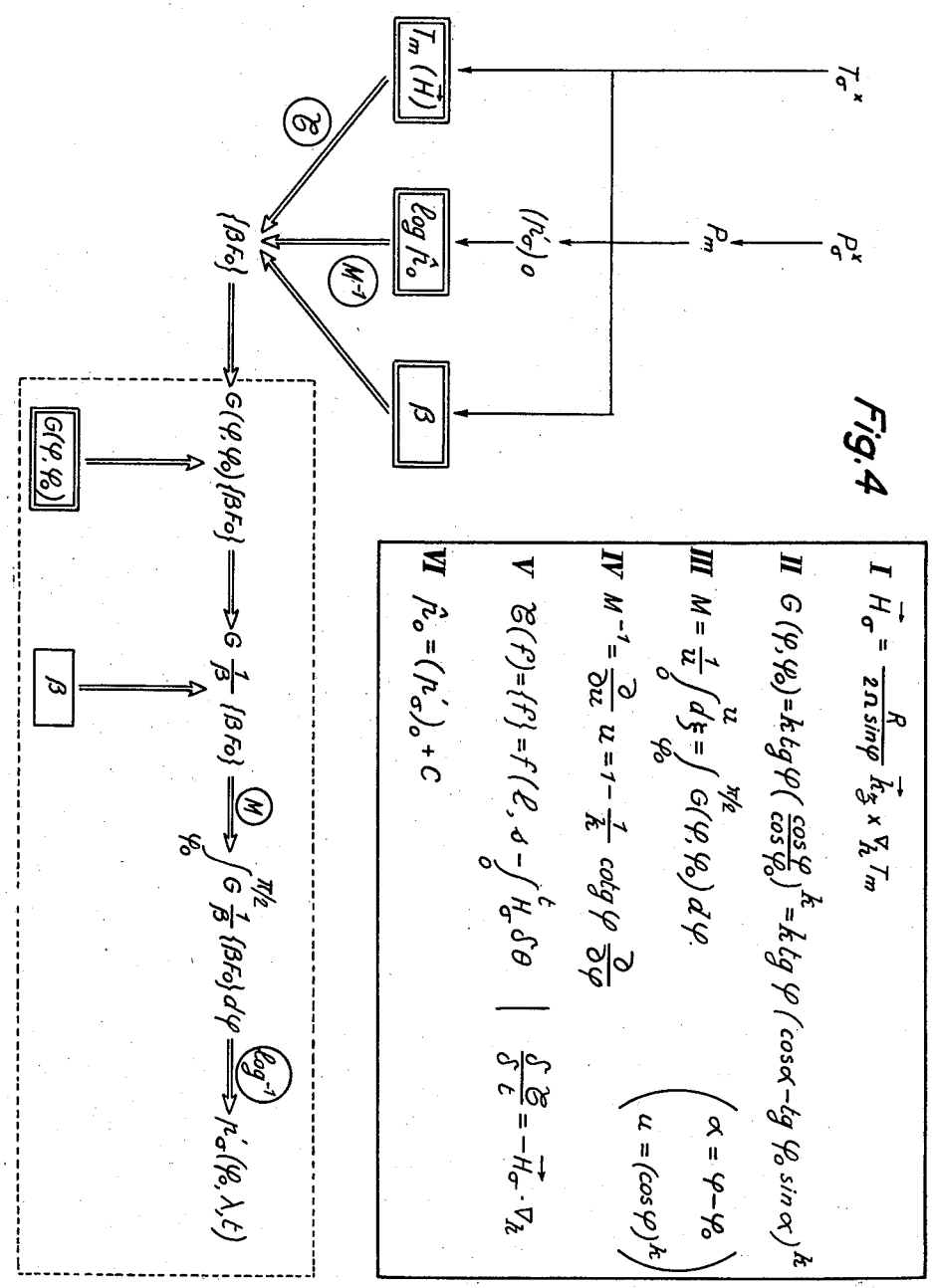
Figure 4 is a block diagram showing the operations performed by the improved apparatus of this invention.

In order to provide a clearer understanding of the disclosure, the essential functions required from the apparatus described in this specification will be briefly summarized hereafter with reference to Fig. 4.

The first function consists in calculating the values of the function $F_0$ of $p_0$ defined by Equation 6, which can be written as follows:

$$(9) \qquad F_0 = \log \hat{p}_0 - \frac{1}{k} \cotg \varphi \frac{\partial \log \hat{p}_0}{\partial \varphi}$$

and transferring these values—after multiplying them by the non-analyticity factor $\beta$—along the streamlines (which are isotherms of $T_m$) of the transfer velocity vector $\vec{H}_\sigma$. Therefore, the operation $\varphi \beta M^{-1}$ illustrated very diagrammatically in Fig. 4 must be effected on log $\hat{p}_0$. Regarding the forecasting at a point A defined by its co-ordinates $\varphi_0$ and $\lambda$, it will be sufficient from the general solution (4) of (1), to consider the streamlines of $\vec{H}$ passing across the meridian of A and to calculate through the Formula 8 those points B of these streamlines of $\vec{H}_\sigma$ which are spaced from the meridian concerned by a transfer time equal to the predetermined time lapse $t$. Then the function $F_0$ is calculated at these points and the resulting values, after they are multiplied by the non-analyticity factor $\beta$, are plotted on the meridian of A on the corresponding streamlines.

The second function consists in calculating the future values of the pressure at a point $A(\varphi_{01}\lambda)$ through an experimental computation of the integral (taken along the meridian of A from $\varphi_0$ to $\pi/2$) of the transferred function $\{\beta F_0\}$ bearing the coefficient $1/\beta$ and "weighted" by the function $G(\varphi_1\varphi_0)$. In other words, the operation involved is $M\beta^{-1}$ (cf. Fig. 4) applied to $\{\beta F_0\}$ according to the notes provided in the above explanation.

Denoting, as usual, by $\{\beta F_0\}$, the function of $\varphi$, $\lambda$, $t$ which results from the transfer of $\beta F_0$ by the vector $\vec{H}_\sigma(\varphi_1\lambda)$ and by G the kernel, the function of $\varphi$ and $\varphi_0$, it appears that the first part of the machine must calculate the expression.

$$I(\varphi_0) = \int_{\varphi_0}^{\pi/2} \frac{1}{\beta} \{\beta F_0\} G(\varphi_1\varphi_0) d\varphi$$

The function $G(\varphi_1\varphi_0)$ is obtained in a continuous manner in respect to $\varphi$ when the argument $\varphi_0$ is fixed by selecting the point $A(\varphi_{01}\lambda)$ where the forecast is to be made.

It should be borne in mind that $$G(\varphi_1\varphi_0) = K \text{ tg } \varphi \left(\frac{\cos \varphi}{\cos \varphi_0}\right)^K$$

where K is a constant approaching 64 in the case of atmospheric pressure. Consequently, the function G has a stationary form which lends itself quite readily to an analogical generation and may be expressed as follows:

(10) $\quad \frac{1}{K}G = G'(\alpha_1\varphi_0) = \text{tg } \varphi(\cos \alpha - \text{tg } \varphi_0 \sin \alpha)^K$ In this expression $\alpha = \varphi - \varphi_0$. The preceding integral is calculated in respect to $\alpha$, i.e.:

(11) $\quad I(\varphi_0) = K\int_0^{\pi/2-\varphi_0} \frac{1}{\beta} \{\beta F_0\} G'(\alpha_1\varphi_0) d\alpha$ For using an electronic integrator, $\alpha = \mu t$ is set down, wherein $\mu$ is a constant which may be selected by the operator of the machine.

Before continuing this description, let us consider how the variable $\alpha$ is obtained. A time constant integrator RC delivers the voltage representing $\alpha$, that is $$\alpha = \mu \left(\frac{t}{RC}\right)$$

where $\mu$ indicates the position of the slider of the potentiometer controlling this integrator (except where otherwise specified, all potentiometers are of the linear type).

A servomechanism reproduces $\alpha$. One of the potentiometers driven by this servomechanism will provide a multiplication by $\alpha$ for a purpose to be explained presently; another potentiometer (driven by a 1/6 gear reduction unit of which the stator, normally stationary with respect to the frame structure on which the servomechanism is mounted, is movable at the operator's option) makes it possible to set the initial value $\varphi_0$ directly in degrees at a scale greater than 1/1, since in this example $\varphi_0$ may only have a value ranging from 20° to 75° (however, these are not strict limits, as values lower or higher than these may be obtained by adequately adjusting the reference voltages and certain coefficients). The purpose of the 1/6 reduction is to represent $\alpha$ and $\varphi_0$ at different scales so that the maximal useful variation of $\alpha$ (about 20°) may take the best advantage of the fields of the potentiometers normally mounted on the servomechanism. This potentiometer is corrected (by a resistor load on the slider) so as to deliver tg $\varphi$.

On the other hand, the very character of the problem involved provides of $\{\beta F_0\}$ a set of discrete values for the different streamlines of $\vec{H}_\sigma$. As the function $G'(\alpha_1\varphi_0)$ decreases very sharply with $\alpha$ for $\varphi_0 > 20°$ in the range of variation where it actually contributes to the value of the integral $I(\varphi_0)$, it is possible to content oneself with a limited number of values of $\{\beta F_0\}$ this number depending on the density of th iesotherms $T_m$). For the various reasons and in the present example the values of $\{\beta F_0\}$ have been limited to six. Of course, were it necessary to take a greater number of these values (case of small $\varphi_0$), this could be afforded without any change as to the principle of the computer.

Consequently, there are six couples of values $\{\beta F_0\}_j$, $\varphi_j$. The manner in which is effected the automatic display of the values of $\{\beta F_0\}_j$ in connection with the second portion of the computer which is to elaborate them will be explained in a later part of this disclosure. For $\{\beta F_0\}$ the following linear interpolation is provided:

(12) $\quad \{\beta F_0\} = \{\beta F_0\}_j + \frac{\varphi - \varphi_j}{\varphi_{j+1} - \varphi_j}[\{\beta F_0\}_{j+1} - \{\beta F_0\}_j]$ Actually, it seems more convenient to write:

$$\{\beta F_0\} = \{\beta F_0\}_j + \frac{\alpha - \alpha_j}{\alpha_{j+1} - \alpha_j}[\{\beta F_0\}_{j+1} - \{\beta F_0\}_j]$$

which is easier to calculate according to the analogical method. Then the product $G'\{\beta F_0\}$ can be expressed as:

$G'(\alpha_1\varphi_0)\{\beta F_0\}_j$ $+\frac{\alpha - \alpha_j}{\alpha_{j+1} - \alpha_j}[G'(\alpha_1\varphi_0)\{\beta F_0\}_{j+1} - G'(\alpha_1\varphi_0)\{\beta F_0\}_j]$ and the two multiplications $G'\{\beta F_0\}_{j+1}$ and $G'\{\beta F_0\}_j$ are subsequently made separately; then the multiplication by $1/(\alpha_{j+1} - \alpha_j)$ is effected. The result is then multiplied on the one hand by $\alpha_j$, on the other hand by $\alpha$, by means of the above-mentioned servomechanism. By grouping again the resulting terms, as just explained, the function of $\alpha$ to be integrated is finally obtained plus or minus an additive constant. The subsequent calculus is immediate.

Of course, the foregoing is valid as long as $\alpha$ lies between $\alpha_j$ and $\alpha_{j+1}(j=1, 2, \ldots n)$. Since all these quantities are electrical voltages, the operations I, II and III hereafter may be carried out by switch means controlled automatically:

I. Stopping the integrator delivering $\alpha$;

II. Stopping the integrator delivering $I(\varphi_0)$ when $\alpha_j$ attains the value $\alpha_{j+1}$;

III. Advancing through one step the switch by means of which the susbtitution regarding the passage from index $j$ to index $j+1$ is effected.

By using two amplifiers adapted to regulate the circuit impedances, the same calculus also applies in obvious fashion to the general case wherein the operation M applies to the function $\{\beta F_0\}/\beta$. Then the values $\beta_j$ corresponding to the $\varphi_j$ (or $\alpha_j$) of the meridian of the forecast point $A(\varphi_{01}\lambda)$ are set.

To calculate the transfer time, the chart of the isotherms of $T_m$ or streamlines of $\vec{H}_\sigma$ is scanned by transparency by the beam of a cathode tube delivering a pulse at the output of a photoelectric cell each time the spot intersects an isotherm.

During the return travel of this spot, as it moves along a meridian, the horizontal scanning of the cathode tube gains in longitude (fundamentally, the arrangement is intended for successively analyzing 100 regularly spaced meridians).

Obviously, the calculus of the forecast implies on the one hand the arbitrary choice of a meridian $\lambda = \lambda_a$ (through the setting of a voltage on a potentiometer) from which the mechanism for carrying out the calculus, which will be described presently, is to be actuated, and, on the other hand, the choice of the latitude $\varphi_0$. The first transfer isotherm will be that intersecting the meridian $\lambda_a$ at the point $\varphi_1$ nearest to $\varphi_0$ and such that $|\varphi_1| < |\varphi_0|$ so as to enable the function $\{\beta F_0\}$ in the interval $\varphi_0 - \varphi_2$ to be calculated by interpolation. Regarding the scanning of the isotherm chart, $\varphi_j$ is therefore represented by the numeral of the relevant isotherm, which is known at any time owing to the counting, from the bottom of this chart, of the number of isotherms encountered along the meridian scanned (of course the isotherm charts should be so drawn in order that the cathode spot will always find the same curve at the beginning of each vertical or meridian line of scanning).

The counter used in this operation may be of the binary preselector type so that when the number of pulses counted equals the preset value representing $\varphi_j$, a carry over (in the arithmetic meaning of the term) will start the integrating operation to be described presently. The operation now considered will take place at each scanning of a meridian from the selected meridian $\lambda_a$.

Of course, the calculus of the transfer or advection time by the velocity field $\vec{H}_\sigma(\varphi_1\lambda)$ is based on Formula 8.

To simplify to a maximum the integral included in this formula the factor $|\sin \varphi|\cos^2 \varphi$ under the integral sign must be eliminated by a suitable scanning law. Let N' be the ordinate of the vertical sweeping spot at the time $\theta$ on a vertical line (meridian) of scanning. If the vertical scanning law is such (see later on) that

(13) $$\frac{dN'}{d\theta} = \frac{a}{\sin \varphi \cos^2 \varphi}$$

$a$ being an arbitrary constant velocity, Formula 8 will be simplified to:

(14) $$t = \frac{2\Omega ra}{R E \Delta T_m} \int_A^B (\Delta\theta) d\lambda$$

where $\Delta\theta$ is the time required for the spot to travel from one isotherm $T_m$ to the next isotherm.

The summing up of the elementary transfer times is effected by an integrator; when this total equals, according to the Formula 14 the value, set by hand at another place, of the predetermined range $t=T_R$ of the forecast, a threshold device starts the calculus of the function $F_0$ at the point of the chart with coordinates $\varphi$, $\lambda$ corresponding to the transfer time $T_r$ on the isotherm passing through the point of co-ordinates $\varphi_j$ and $\lambda_a$. Thus, the transferred function $\{F_0\}$ on the meridian $\lambda=\lambda_a$ is obtained.

Regarding the function $F_0$, a cathode tube, the sweeping movements of which are synchronized with those mentioned hereabove, scans the reproduction, on a photographic plate, of the chart carrying the isolog $\hat{p}_0$. The sign of $\partial \log \hat{p}_0/\partial\varphi$ is entered through a difference in the thickness of the lines representing the isolog $\hat{p}_0$. As a result, the pulse delivered by the photocell scanning this cathode tube has a different duration, according to the sign of $\partial \log \hat{p}_0/\partial\varphi$; a now conventional device enables to select these pulses so that they are added to or subtracted from one another in a binary 7-stage counter providing at any time, the level of the isolog $\hat{p}_0$ encountered or intersected. By modifying, in a manner which can be readily conceived, the plotting of the lines isolog $\hat{p}_0$ in a narrow "dead" zone near the lower edge of the chart, it is possible to enable the counter, starting from zero at each new vertical scanning line, to give for any recorded pulse the value of log $\hat{p}'_0$.

In addition to the recording of log $\hat{p}_0$ it is necessary to calculate the time $\delta\theta$ in which the scanning spot passes from one isolog $\hat{p}_0$ to the next isolog $\hat{p}_0$. This calculus is carried out by summing up, in a binary counter, a series of pulses (having a fixed higher frequency) between the two pulses produced by the passage of the scanning spot on the two consecutive isologs $\hat{p}_0$. All these binary counters are subordinated to the time blocking system to permit the taking out of the value required for calculating the function $F_0$.

When log $\hat{p}_0$ and $\delta\theta$ are known it is an easy matter to deduce the function $F_0$. In fact, Formula 9 may also be expressed as follows $$F_0 = \log \hat{p}_0 \pm \left(\frac{Er}{k}\Delta \log \hat{p}_0\right)\frac{1}{D_{N'} \sin \varphi}$$

Considering the law (13) of the vertical scanning, we have:

$$F_0 = \log \hat{p}_0 \pm \frac{Er(\Delta \log \hat{p}_0)}{ka}\frac{\cos^2 \varphi}{\delta\theta}$$

with $$\delta\theta = \frac{1}{a} \sin \varphi \cos^2 \varphi D_{N'}$$

Now, the Mercator projection is characterized by the following property.

$$\cos \varphi \, dN' = Er d\varphi$$

If we compare this formula with (13) we see that $$(Er)\frac{d\varphi}{d\theta} = \frac{a}{\sin \varphi \cos \varphi}$$

and consequently $$\sin^2 \varphi = \left(\frac{2a}{Er}\right)\theta$$

and

(15) $$\varphi = \arc \sin\sqrt{\frac{2a}{Er}\theta}$$

with $\varphi=0$ (equator) for $\theta=0$ (beginning of each line of scanning).

Taking (15) into account, we finally obtain

(16) $$F_0 = \log \hat{p}_0 + \frac{A - B\theta}{\delta\theta}$$

the constants having the following values:

(17) $$A = \frac{Er}{ka}(\Delta \log \hat{p}_0); \quad B = \frac{2}{k}(\Delta \log \hat{p}_0)$$

From the foregoing, it will be seen that $F_0$ is obtained by adding to log $\hat{p}_0$ the quotient $(A-B\theta)/\delta\theta$ with a sign applied to $\delta\theta$ equal to the sign of $-\sim\log_0/d\varphi$. The function $A-B\theta$ is a linear function of the sweeping time and can be obtained without any difficulty. This function is applied to the decoder of the binary counter providing the numeric representation of $\delta\theta$, which decodes the inverse of $\delta\theta$; thus, the quotient $(A-B\theta)/\delta\theta$ is obtained. Besides, the sign is known at the forecast time owing to the selection of the sign of the last pulse taken on the chart of the isolog $\hat{p}_0$ as this sign actuates a switch before the quotient just calculated as a modulus is added to log $\hat{p}_0$.

For the preceding operations to be valid, it is necessary that the vertical scanning velocity of the cathode tubes of $T_m$, of log $\hat{p}_0$ and of $\beta$ respectively, along the meridians, complies with the law (13).

It is an easy matter to determine the voltage $V(\theta)$ to be produced by the corresponding scanning generator.

The ordinate N' of the scanning beam is at any time proportional to V:

(18) $\quad N'(\theta) = CV(\theta) \quad$ (C=constant)

From the relation $$\cos \varphi \, dN' = Er d\varphi$$

it appears on the other hand that

(19) $$N' = Er \log \left[\text{tg}\left(\frac{\pi}{4} + \frac{\varphi}{2}\right)\right]$$

From this result and from (15) and (18) the desired function

(20) $$V(\theta) = \left(\frac{Er}{c}\right) \log \left[\text{tg}\left(\frac{\pi}{4} + \frac{1}{2} \arc \sin \sqrt{\frac{2a}{Er}\theta}\right)\right]$$

is obtained, which gives the vertical scanning voltage consistent with the requirement (13) and the properties of the Mercator projection.

Figure 4 of the attached drawings shows the block diagram of the complete sequence of operations. From this figure it will be seen that the isotherms of $T_m$, the isolog $\hat{p}_0$ and the $\beta$ isocurves are introduced into the apparatus and that the operation indicated a $\varphi\beta$ $M^{-1}$ is carried out on log $\hat{p}_0$. The values of $\{\beta F_0\}$ thus determined are then fed to the second portion of the apparatus which carries out the operation consisting in generating and inserting the function G' and subsequently the coefficient $\beta$ in order to make it possible to effect on $\{\beta F_0\}$ the operation $M\beta^{-1}$ giving log $\hat{p}$. A complemental apparatus gives the desired function $p_0'(\varphi_0,\lambda,t)$ from log $\hat{p}$.

Figure 5:
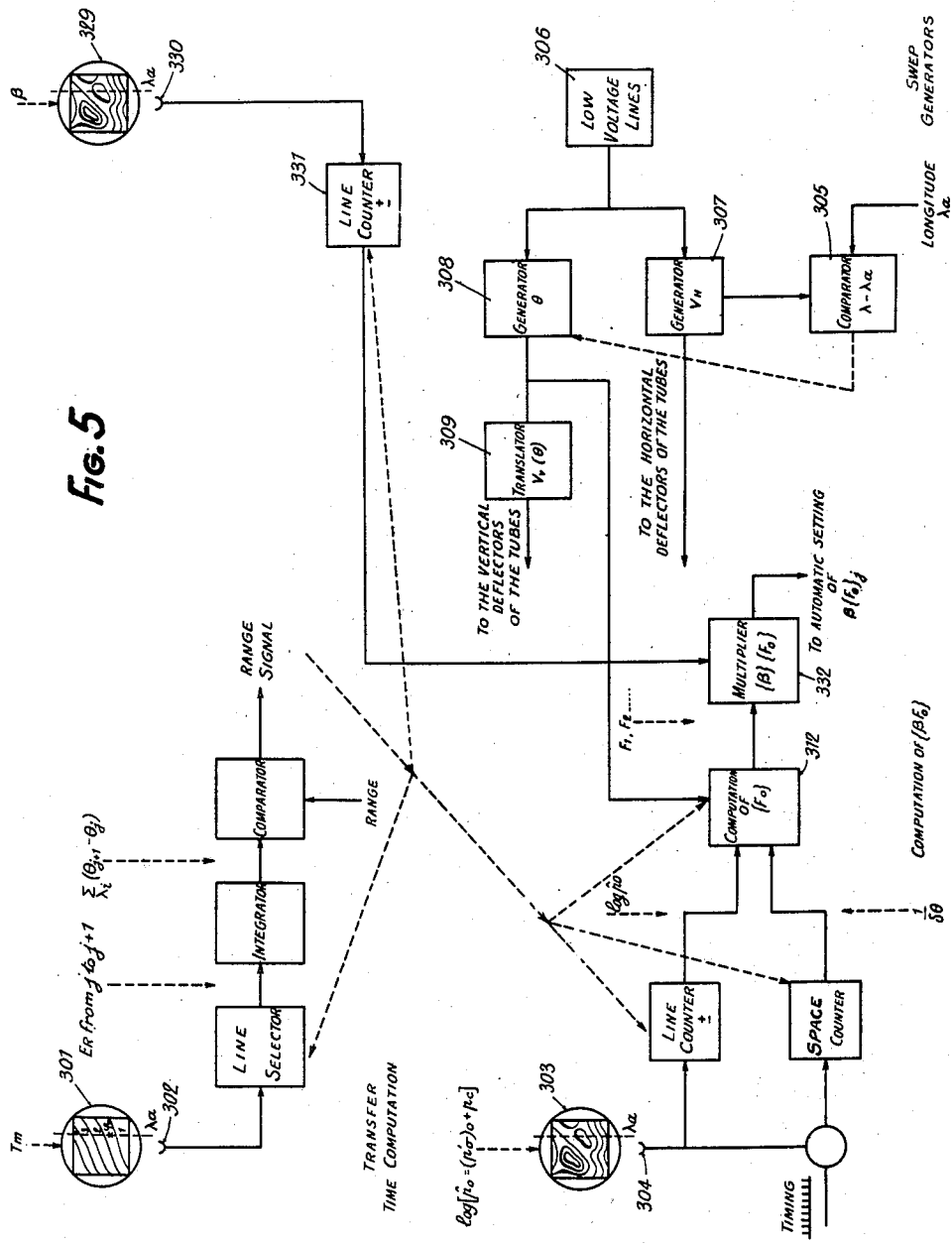
Figure 5 is another block diagram showing the first part of the apparatus, for calculating the transferred function $\{\beta F_0\}$.

Referring now to the diagram of Fig. 5, 301 is the plate carrying the isotherms of $T_m$. This diagram also shows diagrammatically at 302 the electro-optical apparatus for transmitting the pulses through a line selector, then through an integrator and finally to a comparator in which a given forecast range $T_R$ is preset. The range signal is then transmitted as indicated by the broken lines, both to the line selector just described and to the second set of this first portion of the apparatus, that is, the set which scans the curves isolog $\hat{p}_0$.

In this second set, 303 is the plate carrying the curves isolog $\hat{p}_0$ and 304 an electro-optical apparatus. The latter transmits the pulses to a line counter and a differences counter, both of which are also responsive to the aforesaid range signal. The results obtained by these two counters are then transmitted to a computer of $F_0$ which carries out the operation mentioned hereinabove.

The longitude of the meridian $\lambda_a$ considered is set in a comparator shown at 305 in this figure. 306 is a source of current supplying a horizontal scanning generator 307 and a vertical scanning generator 308 and 309. These two generators feed the deflector devices of all the cathode tubes of the apparatus.

The block 312 delivers the function $\{F_0\}_j$, but the product to be obtained is $\{\beta F_0\}_j$. Therefore, a third cathode tube 329 carrying the graphical representation of the iso $\beta$ curves, and a photocell 330 are added to the apparatus. The pulses derived from the scanning of the chart 329 are transmitted through a line counter 331 to a multiplier 332 to which the calculated values of $\{F_0\}_j$ are also fed. As a result, the product $\{\beta F_0\}_j$ is delivered directly by the block 332.

Figure 6:
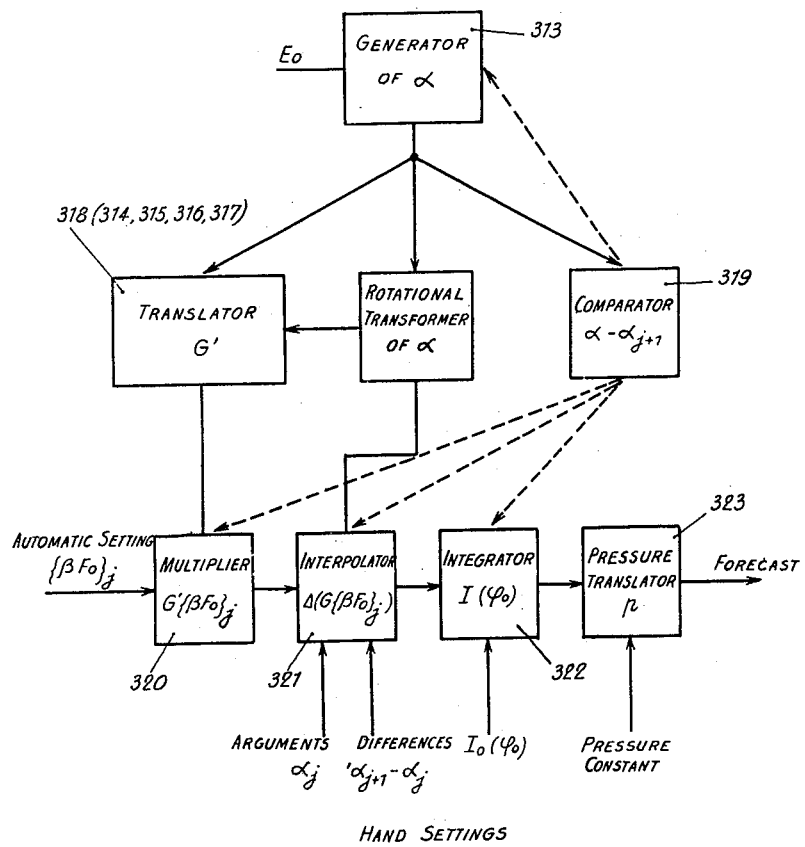
Figure 6 is also a block diagram concerning the second part of the apparatus, that is, the part receiving the function $\{\beta F_0\}$ from the first part and delivering the required final function.

The transferred values of $\{\beta F_0\}_j$ on the isotherms of $T_m$ corresponding to $j=1, 2, 3 \ldots$ are transmitted to the second portion of the apparatus represented in Fig. 6. This second portion of the apparatus is intended, as already set forth hereinabove, to produce the function G' and multiply the values of $\{\beta F_0\}_j$ by this function.

As a start, let us describe that portion of the apparatus which is designated as "translator G'" and bears the reference numeral 318 in Figure 6. This portion of the apparatus is shown more in details in Fig. 7. The values of $\alpha$ are applied simultaneously to both apparatus 314 and 315 giving the one cos $\alpha$ and the other sin $\alpha$. Then the results obtained are fed to a constant factor multiplier adapted to produce $\cos\alpha - tg\varphi_0 \sin\alpha$. The result of this operation is transmitted to a device adapted to raise a quantity to the power K which is shown at 316 in Fig. 7, this device being followed by a multiplier by $tg\varphi$ and by an adaptor 317 delivering the function G'. The set of parts just described is shown diagrammatically in block form at 318 in Fig. 6.

The set illustrated in Fig. 6 also comprises a comparator 319 for blocking the apparatus when $\alpha$ equals the value $\alpha_{j+1}$.

The function $\{F_0\}_j$ or more generally $\{\beta F_0\}_j$ is admitted, as well as the function G', in a multiplier 320 giving the value of the product in an interpolator 321 receiving also the arguments $\alpha_j$ and $\alpha_{j+1}-\alpha_j$. The interpolator 321 feeds the resulting value to an integrator 322 transferring in turn the result of its operation to a pressure translator 323.

In Fig. 8 there is shown the general case wherein a non-analyticity coefficient $\beta\neq 1$ is introduced.

On the other hand, the whole of this Figure 8 corresponds to the blocks 320, 321 of Fig. 6.

Figure 7:
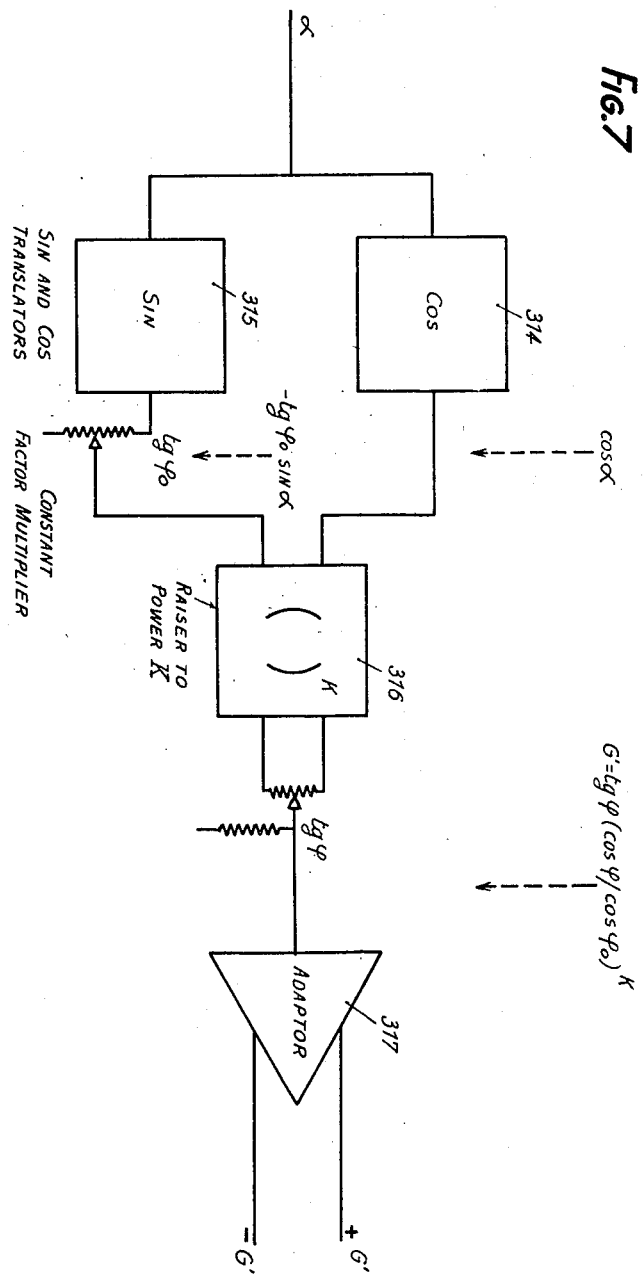
Figure 7 is a block diagram referring to that part of the improved apparatus whereby the function G can be determined.

In this example, the function G' as resulting from the apparatus shown in Fig. 7 is delivered to the apparatus shown in Fig. 8. In this last mentioned apparatus a divider 324 is provided whereby $\{\beta F_0\}_j\beta/_j$ can be obtained, and also a multiplier 325 delivering the product $G'\{\beta F_0\}_j/\beta_j$ subsequently admitted in an adaptor 326.

This adaptor is followed by a multiplier by $1/(\alpha_{j+2}-\alpha_j)$ and the product therefrom is then transmitted through another adaptor followed by a multiplier by the variable factor $\alpha$ and the constant factor $\alpha_j$. After this multiplier an interpolator 321 is provided and gives $$\Delta[G'\{\beta F_0\}] = G'\frac{\Delta\{\beta F_0\}_j}{\Delta\varphi_j}(\varphi-\varphi_j)$$

In Fig. 9 there is shown a very simple arrangement whereby the values delivered by the integrator $I(\varphi_0)$ may be translated directly in terms of pressure. This figure illustrates the details concerning the blocks 322, 323 (Figure 6). This portion of the apparatus comprises an integrator 322 receiving the values $I(\varphi_0)$ and $G'\{\beta F_0\}$. The integrator is followed by a constant factor multiplier and by a pressure translator 323. These translators deliver the resulting values to either a reading instrument or a recording device. These reading and recording apparatus are shown at 327 and 328, respectively.

In Figure 10 there is shown a materially more complete diagram showing the first portion of the apparatus, that is, the portion in which the value of $\{\beta F_0\}_j$ may be elaborated. The principle of this apparatus is strictly identical with that from which the diagram of Figure 5 was drawn. It will be noted in this diagram that the three electro-optical apparatus are combined to provide the simultaneous scanning of the isotherm of $T_m$, of isolines log $\hat{p}_0$ and $\beta$-isocurves.

In order to simplify the description and facilitate the comprehension of the first portion of the apparatus the diagram has been divided into four parts indicated with dotted lines and numbered I to IV. Each one of these parts performs a particular function and is described hereafter.

Part I shows the devices delivering the horizontal and vertical scanning voltages for each one of the three cathode ray tubes 301, 303, 329.

The device delivering the horizontal scanning voltage comprises a generator 307, of known type, this voltage being led to an appropriate integrator 333 of known type and thence to the comparator 305; a potentiometer 334 is provided for the manual setting of the initial longitude $\lambda_a$ (that is to say the setting of the coordinate of the first scanning line). When the scanning reaches the position of longitude $\lambda_a$ the comparator unblocks the gate 362 in part II and the gate 363 in the vertical scanning voltage supply line.

The device delivering the vertical scanning voltage comprises the trigger stage 376, the integrator 308, the function translator 309 and the potentiometer 336 for the manual setting of the equator $\varphi_c=0$.

Generator 307 and translator 309 are fed by the low voltage generator 306.

Part II shows the cathode ray tube 301 with the transparent support for the chart of the transfer lines $T_m$, and the photo electric cell 302, on which is applied the image of the screen of the tube 301. The electrical impulses generated by the cell 302 are delivered through an amplifier 302' to the decimal counter 337, which is fed, on the other hand, by the voltage generator 306. Said counter 337 is in connection through a trigger stage 361 with an integrator 338 which integrates the elementary transfer times corresponding to the distances of the two isotherm lines which are being scanned. Said isotherm lines are chosen by means of a potentiometer (not shown) connected with the counter 337 through the conductor 339.

The integrator 338 acts on a comparator 340 (mounted with an appropriate amplifier 341) which compares the values of the scanning times $t$ delivered by the integrator 338 with a voltage from a potentiometer 343 automatically set to correspond with the forecast range. The automatic setting of potentiometer 343 is performed by means of a relay 373 energized at each end of the cycle (see hereinafter—part V, Figure 11). The impulse operating said relay 373 is passed through input 374. When the integrator output has reached the predetermined value the comparator 340 sends out a time expiration impulse to block gate 362 and gates 363 in part I, 364, 365 and 368 in part III and 369 in part IV. Said impulse is also fed to a relay 379 operating a contact 380 (part III) and to the output 381.

At the end of the transfer operations (see hereinafter part V—Figure 11) an impulse resets to zero: counter 337, integrator 338 (part II), counter 351 (part IV), integrators 333 and 308 (part I), and counter 342 (part III). Said impulse is sent by part V (Figure 11) and is passed through input 375.

Part III shows the devices for calculating the function $F_0$ from a chart of isolines of $\log \hat{p}_0$, positioned on the screen of a cathode ray tube 303. A photoelectric cell 304, delivers electrical impulses which are delivered through an amplifier 304' to the binary counter 342, until gate 364 is blocked as described above. The impulses are also passed to a line thickness discriminator 366 and a pulse-delay 366', said discriminator is associated with a trigger stage 367 to select whether the counter is to increase (+) or decrease (—) its value. The binary counter 342 is associated in a known manner with decoder 344, the voltage delivered by said decoder feeds an amplifier 345, and is proportional to the value $\log \hat{p}_1$. On the other hand, the impulses generated by the cell 304 act on a second binary counter 346 having a decoder 347, the decoder 347 delivers a voltage proportional to $$\frac{1}{\delta\theta}$$

($\delta\theta$ representing the scanning time between two consecutive impulses generated by the cell 304). The voltage issuing from the decoder 347 is delivered to a multiplier 348 through a contact 377. Said contact 377 is set in the appropriate position in accordance with the sign of $\theta$ by means of a relay 378 controlled by the selector 367. On the other hand said multiplier receives a voltage representing the function $A - B \theta$; $A$ and $B$ are constant quantities, values of which are set on the potentiometers 350 and 349 respectively, $\theta$ is the scanning time, delivered under the form of a voltage by the part I described hereabove.

Thus, the function $F_0$ appears, in the form of a voltage at the output of the amplifier 345.

Part IV shows the devices calculating the function $\beta$. The cathode ray tube 329 scans the chart of $\beta$-isocurves. The cell 330 delivers impulses through an amplifier 330' to the binary counter 351 which co-operates with a decoder 352. The voltage at the output of said decoder represents the value of $\beta$ and is applied to a multiplier 332 which delivers the function $\{\beta F_0\}_j$ continuously; a voltage representing said function $\{\beta F_0\}_j$ is delivered at the output 382 and as soon as the value of the preset forecast range has been reached, the gate 369 is blocked. In part IV elements 370, 370' and 371 correspond to the elements 366, 366' and 367 of part III.

Figure 11:
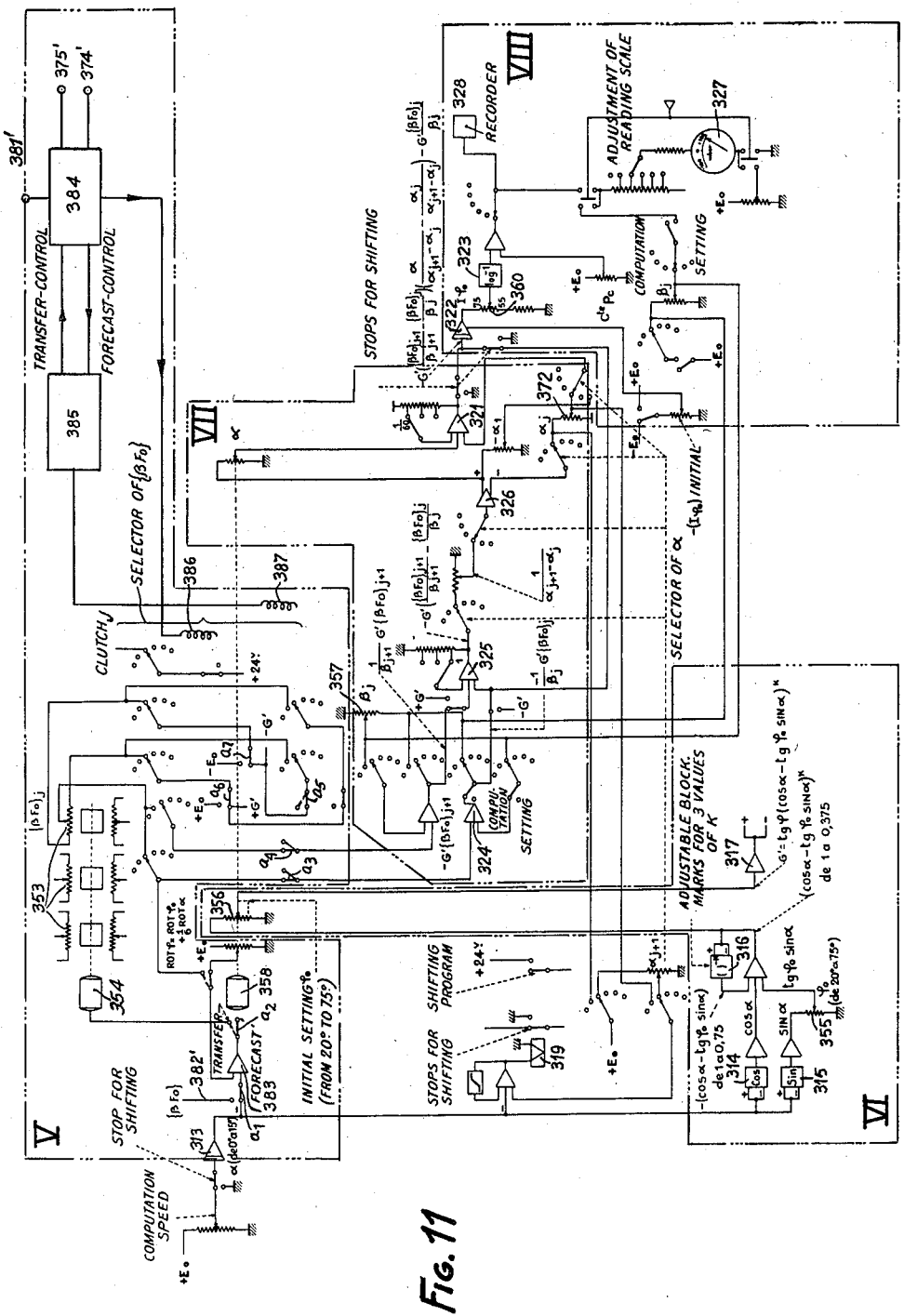
Figure 11 is a diagram similar to that of Figure 10 but showing the second part of the improved apparatus of the invention.

In Figure 11, there is shown the diagram concerning the second portion of the apparatus, that is, the portion thereof which receives the values of $\{\beta F_0\}_j$ and delivers the function required. In this case also, the principle of the apparatus is strictly identical with that from which the diagram of Figure 6 was drawn.

The diagram has been divided into four parts in the same manner than the precedent one. Said parts are indicated in dotted lines and numbered V to VIII. Each one of these parts performs a particular function and is described hereafter.

Before describing these parts, it may be noted from the diagram that an output from the generator of (313) is taken to the comparator 319 to which is also fed a lead from a ganged switch to feed a voltage representing $\alpha_{j+1}$. When the value of $\alpha$ reaches $\alpha_{j+1}$ the comparator both opens various switches marked "stops for shifting" in Figure 11, and operates a shifting programme on the ganged switches of that figure.

Part V shows the device performing the automatic setting of the values of $\{\beta F_0\}_j$ delivered by part IV of Figure 10 and performing the multiplication of said values by the weight function $G'$, delivered by part VI. Said operations are effected alternatively and controlled by the programming circuits 384 and 385.

For the setting of $\{\beta F_0\}_j$ switches $a_1, a_2, a_3$ . . . etc. are positioned as indicated in dotted lines. A voltage proportional to $\{\beta F_0\}_j$ is delivered at input 382' (corresponding to output 382 of part III—Figure 10) and controls the servomotors 354, which are caused to rotate proportionally to said value $\{\beta F_0\}_j$. There are six servomotors 354 which have not been shown individually in the figure; these servomotors 354 control the setting of six potentiometers 353, each of which is connected to a respective terminal on the ganged switches marked "selector of $\{\beta F_0\}$" in part V; the connections of one of the potentiometers 353 are shown in Figure 11. The selector of $\{\beta F_0\}$ is thus used to energise each potentiometer in turn; it is also used to energise the appropriate motor 354, the circuits for this purpose not being shown in the figure. Each value $\{\beta F_0\}_j$ is set on one of the potentiometers 353, and the switches marked "selector of $\{\beta F_0\}$" are moved in turn (under the control of the programming circuit 384) by a relay 386 until all six values of $\{\beta F_0\}_j$ have been set on the six potentiometers. The programming circuit 384 receives for each value $\{\beta F_0\}_j$ a setting signal issued from part III (Figure 10) and fed to input 381' (corresponding to output 381).

The second operation performed by part V is the multiplication of the set values of $\{\beta F_0\}_j$ by the function $G'$. Said second operation is a portion of the forecast operation, performed by the circuits shown in part VIII (described hereinafter). The switches $a_1, a_2, a_3$ . . . etc. are then positioned as indicated in full lines. The switches forming the selector of $\{\beta F_0\}_j$ together with the selector switches of part VII are operated by the programming circuit 385 through a relay 387. The programming circuit 385 receives, at the end of the automatic setting operation, a signal from the programming circuit 384, and sends, at the end of the cycle, a signal to said programming circuit 384, which sends in turn a signal to part II (Figure 10).

Said programming circuit 384 sends out an end of shifting signal through output 375' (corresponding to 375) and an end of cycle signal through output 374' (corresponding to 374).

Part VI (corresponding to Figure 7) shows the function translator delivering the weight function $G'$. It comprises the sin and cosin resolvers 314 and 315, a potentiometer 355 for the manual setting of (tan $\varphi_0$), and a further network (316) for raising the function (cos $\alpha$ — tan $\varphi_0$ sin $\alpha$) to power K, whereby a voltage proportional to (cos $\alpha$ — tan $\varphi_0$ sin $\alpha$)$^K$ is delivered to the potentiometer 356. The slider of said potentiometer 356 is operated by the servomotor 358 reproducing $\varphi$ and it delivers a voltage proportional to $G'$ to the amplifier 317 ($\varphi$ and $\alpha$ are linear functions of time and are delivered by the same device).

Part VII (corresponding to Figure 8) comprises a divider 324 which is fed on one hand by the part V ($\{\beta F_0\}_j$) and on the other hand by the part VI ($G'$). The divider 324 and the potentiometer 357 together with the amplifier 325 phase splitting amplifier 326 and the potentiometers 359 and 372 (compare Figure 8)—all of which are shown in Figure 11—together constitute the multiplier 320, the output of which is delivered to the summation circuit 321.

Part VIII (corresponding to Figure 9) comprises an integrator 322 for calculating the integral $$\frac{I(\varphi_0)}{K}$$

The voltage delivered by said integrator 322 is fed to the potentiometer 360 for performing a multiplication by the constant factor K and to the antilogarithmic pressure translator 323. The voltage delivered by said translator 323 operates either the reading instrument 327 or the recorder 328.

Figure 12:
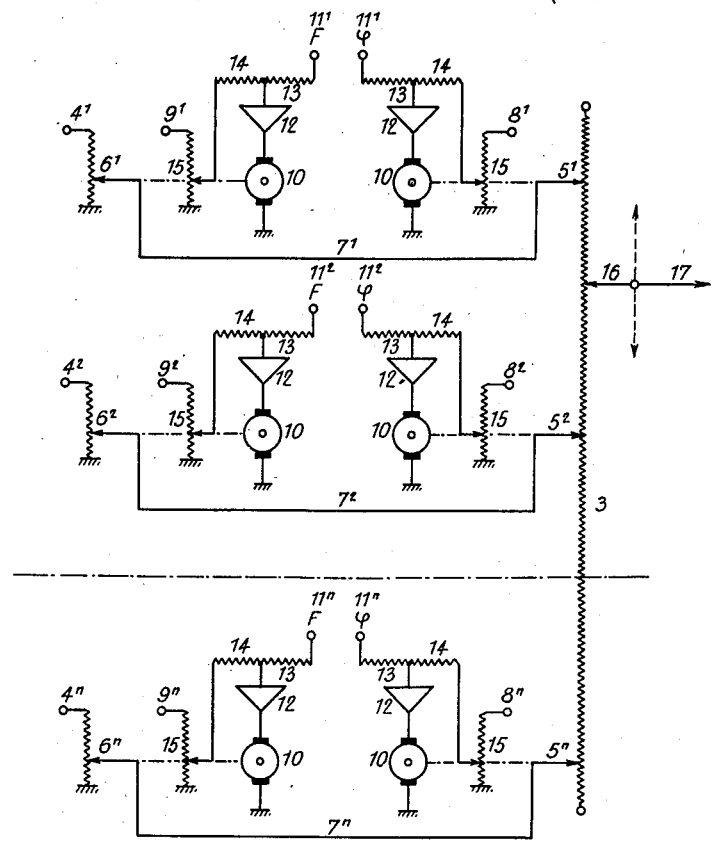
Figure 12 shows the wiring diagram of a modified form of a static recorder provided in the apparatus according to the invention.
Figure 13:
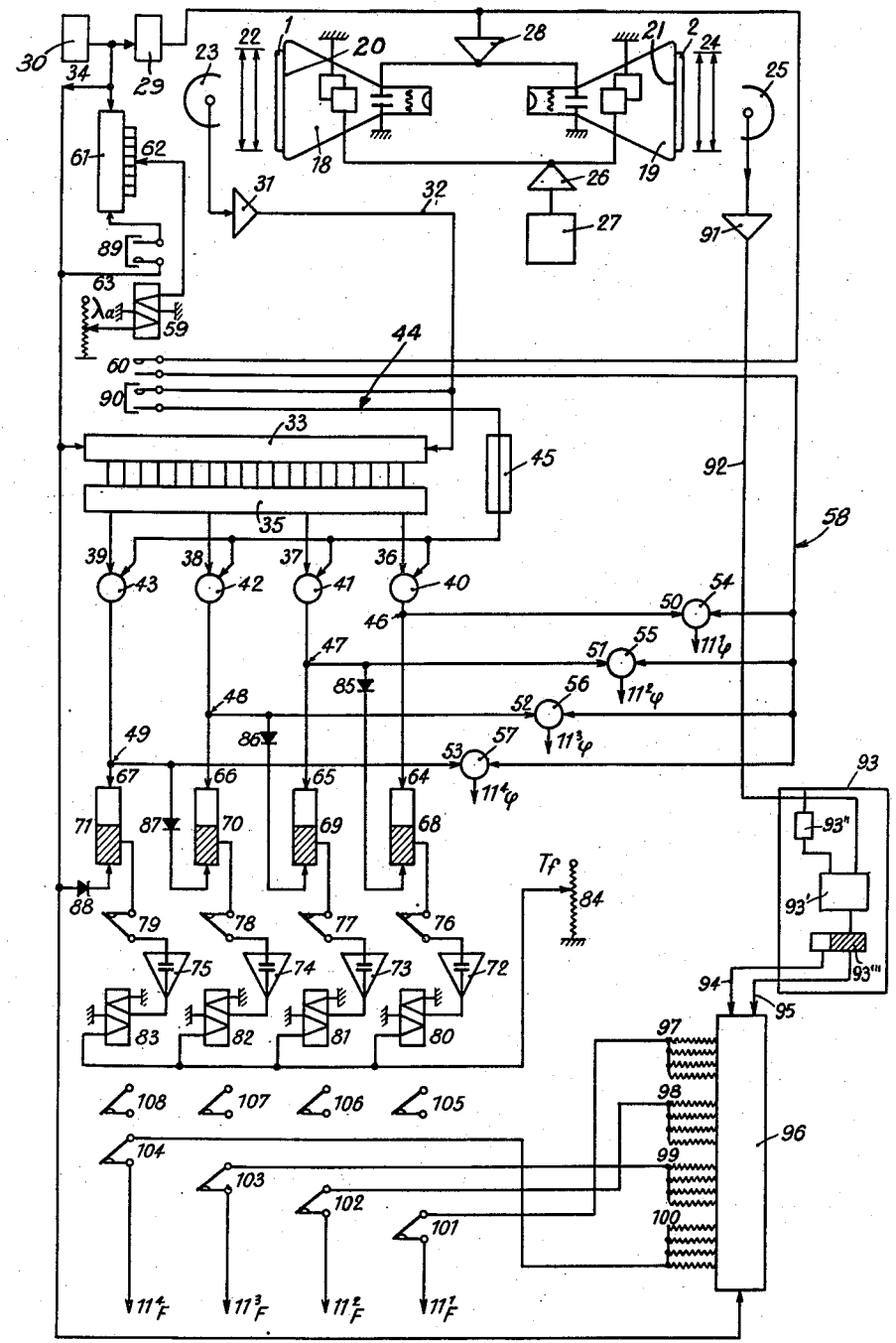
Figure 13 illustrates the complete wiring diagram of a modified type of the apparatus according to the invention.
Figure 14:
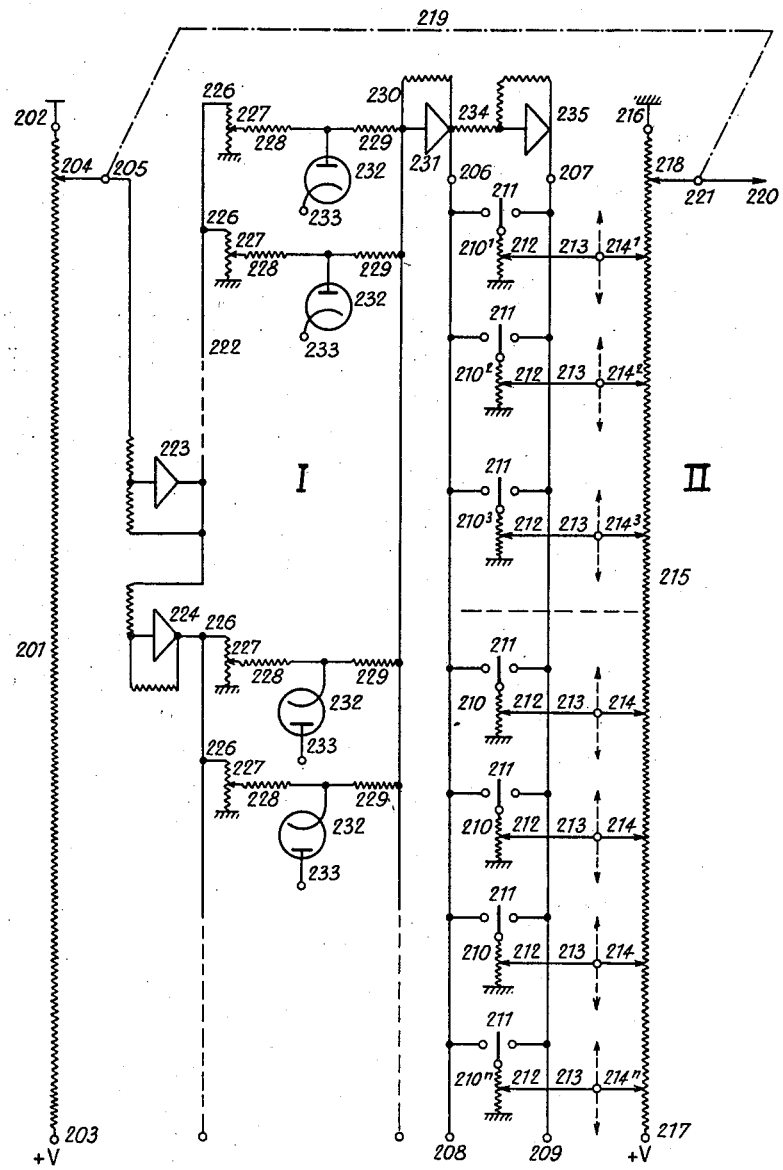
Figure 14 is the wiring diagram of a modified multiplier according to the invention.

Figs. 12, 13 and 14 show another type of apparatus embodying features according to the invention.

The recorder is illustrated diagrammatically in Fig. 12. It comprises on the one hand a potentiometer for recording the values of the variable $\varphi$, for a purpose to be disclosed later, and on the other hand a set of individual potentiometers indicating the values of the function $\beta F_0$. The potentiometer for recording the values of the variable $\varphi$ is shown at 3, the potentiometers for recording the values of the function $\beta F_0$ are shown at $4^1$, $4^2$, ... $4^n$. On potentiometer 3 a number $n$ of sliders $5^1$ to $5^n$ are adjustably mounted and on each potentiometer 4 a single slider 6, from $6^1$ to $6^n$, is also adjustably mounted. Each pair of sliders $5^1$—$6^1$, $5^2$—$6^2$, ... $5^n$—$6^n$ is electrically connected through a wire $7^1$, $7^2$, ... $7^n$. Each slider 5 is driven by a positioning servomechanism 8 and each slider 6 is similarly actuated by a positioning servomechanism 9. These servomechanisms are of a type adapted to reproduce the value of an electrical signal applied to the input control terminal of the relevant amplifier 12 by positioning accordingly the axis of their control motor 10; their adjustment variation discriminator consists of a summator having two equal resistors 13 and 14 connected to the input of the high-gain amplifier 12 and the voltage fed to resistor 14 is taken from the slider of a reference potentiometer 15, this slider being driven by the motor shaft, and a constant voltage being applied across the terminals of this potentiometer. With this individual mounting (already known per se) it is obvious that the position of balance of the motor will correspond to the equality in values of its two input voltages in opposite polarities.

As these servomechanisms are all identical in design it would even be possible to cause each of them to play the dual part of indicating first the value of the variable and then the value of the function (since the recording of these two values will occur at two different times), by mechanically switching sliders 5 and 6 on the shaft of a single control motor and also by correspondingly switching their input terminals 11 relative to the connections through which the variable voltage and function voltage are transmitted. However, in order to simplify the disclosure, each input terminal 11 carries an exponent indidicating the rank of a servomechanism and an index indicating the magnitude of which it controls the recording.

The successive setting of all these indicating potentiometers will therefore determine the recording proper of a discrete set of values $\{\beta F_0\}_1$, $\varphi_1$; $\{\beta F_0\}_2$, $\varphi_2$; ... $\{\beta F_0\}_n$, $\varphi_n$; which will in turn define a certain function $\{\beta F_0\}(\varphi)$, transferred from the initial function $\beta F_0$ in a computer according to the invention. Then, if it is desired, on any required ground, to establish a representation of this function in the form of an electric voltage, it will be merely sufficient, on the one hand, to apply for instance a constant voltage to the set of potentiometers 4, and, on the other hand, to apply for instance an equally constant voltage to the end terminals of potentiometer 3, and to displace a general slider 16 along this potentiometer 3 for deflecting to the output 17 of this slider 16 any electric voltage representing a specific value of the function $\{\beta F_0\}$ in terms of the corresponding value of the variable $\varphi$, the potentiometer 3 providing an interpolation between the discrete values $\{\beta F_0\}_1$, ..., $\{\beta F_0\}_n$. Potentiometer 3 is a rotary potentiometer. Slider 16 is moved proportionally to $\alpha$ by a servomechanism reproducing $\alpha$, and shown in Fig. 11. The output 17 is applied to interpolator 321 (Fig. 6). Variable $\alpha$ is a time function and appears as a voltage at the output of block 313. This voltage is directly applied to sinus and cosimus blocks 314 and 315, and is also applied to a servomechanism and appears as an angle on potentiometer 3.

The diagram analyser or scanning device considered herein consists of a pair of cathode ray tubes 18 and 19, Fig. 13, of which the pairs of deflecting elements, consisting for example of electromagnetic coils or electrostatic plates if desired, are fed correspondingly with the same scanning voltages or currents. The fluorescent screen 20 of tube 18 has placed thereon the transparent support 1 for the diagram of Fig. 2 and the fluorescent screen 21 of tube 19 has positioned on it the transparent support 2 of the diagram of Fig. 3. Through optical means 22 the image formed on the screen 20 is applied to the photocathode of a photoelectric cell 23, and similarly the image formed on the screen 21 is applied through optical means 24 to the photocathode of a photoelectric cell 25.

The pairs of horizontal deflecting elements acting upon the beam of both tubes 18 and 19 are fed for example through a sweep amplifier 26 from a video sweep voltage oscillator 27 of a type conventional in television equipment, which is designed to deliver a linear saw-tooth voltage so that the horizontal displacement of both light spots on screens 20 and 21 will occur at a constant velocity. This, in Figs. 2 and 3, corresponds to the scanning of the diagrams along the longitude axis.

The pairs of vertical deflecting elements acting upon the beams of both tubes 18 and 19 are similarly fed through a scanning amplifier 28 from a line sweep pulse generator 30 controlling a line sweep voltage generator 29. If the rating of the pulse generator 30 is taken constant, as usual in television synchronizing equipment, this generator 29 may be designed to produce a waveform of which each variation per line occurs according to a specific law governing the scanning velocity in terms of time. In the case for example of geophysical studies on Mercator charts this law is given by Formula 20 which is a consequence of the condition 13 and the properties of the Mercator projection.

It is not necessary to describe here in detail a sweep generator of this kind, that is, having a velocity law variable per line, because they are already well-known in the field of radar detectors and in television, and operate by selective additions of waveforms to a conventional linear saw-tooth wave. Besides, this generator may be designed to produce firstly a linear saw-tooth waveform which is subsequently fed to the input of a function translator device in other words a transfer argument device variable according to the amplitude of the incoming signal, such as a transfer argument device having for instance a parabolic characteristic. Such function translators are also known in the technical field involved.

On the other hand, whatever be the arrangments adopted for the generator 29, it will be obvious that, on the transmission channel 32 derived from the output of the amplifier 31 of photocell 23 at each vertical sweep line there will appear as many electrical pulses as there will be intersections between the spot following this line and the streamlines of the diagram of the field $\vec{H}_\sigma$ of Fig. 1. Thus, by connecting this transmission channel 32 to the input of a pulse counter 33 the latter will obviously progress by one step at each of these pulses and that between two input pulses it will remain at the counting position attained during a time interval $\Delta\theta$ given by $$\Delta\theta = \frac{1}{a} \sin\varphi \cos^2\varphi \, \Delta N'$$

as already explained.

The scanning pulse counter 33 is reset after each sweep line and for this purpose it will be sufficient to connect a resetting input of this counter to a special output 34 of the line synchronizing pulse generator 30; then the resetting of the counter 33 will take place during each sweep-line blanking period.

The counter 33 is an ordinary counter the progression of which may take place either step-by-step or according to the known binary code. In this case a decoder 35 is associated with the counter and adapted to deliver at its outputs (of which four, 36 to 39, are shown here) counting position indexing voltages as usual.

The outputs 36 to 39 are connected separately to the inputs of as many transfer stages, in this case 40 to 43, as there are outputs which transfer stages are adapted to receive simultaneously at another input any pulse controlling the forward motion of counter 33 as by-passed through a branch line 44 of channel 32 and including a delay element 45 such as an electromagnetic artificial line section of a monostable multivibrator.

In this specification "transfer stage" means any network or circuit, frequently termed "gate" in electric computers, designed to effect electrically the logical operation "AND" between two magnitudes, by delivering an output signal when two predetermined voltages coexist at two separate inputs. One simple example of transfer stage consists of a three-grid vacuum tube receiving an intelligence voltage on its control grid and a transfer voltage on its suppressor grid, this intelligence voltage being transmitted only if this voltage coexists with the transfer voltage simultaneously, both voltages being of positive polarity, of course. Another example of a suitable transfer gate consists of a pair of unidirectional elements such as rectifier crystals connected with same polarity to a common point biased to keep both crystals conductive in the absence of separate input signals, the potential of this point varying only if both crystals are blocked (however, this last example is only convenient in case of all-or-nothing intelligence transmission).

Thus, by mounting these gates at the position indexing outputs of counter 33 the certainty will be had that one and only one of the transfer stage output channels will be energized. The output channels are designated by the reference numbers 46 to 49 in Fig. 13.

These output pulses will serve a dual purpose in the computer: i.e. they will firstly be used to determine the recording of the values $\varphi_1, \varphi_2, \ldots \varphi_n$, of the variable $\varphi$ on the meridian $\lambda = \lambda_a$. To this end they are directed through branch lines 50-53 toward the transfer control inputs of as many transfer gates indicated at 54-57 and the outputs of which are connected—as indicated by the corresponding signs of reference—to the input terminals 11 of the servomechanisms controlling the indexing of these values of the variable (see Fig. 12). On their other inputs the transfer stages 54-57 receive in common the vertical sweep voltage from the generator 29. This voltage is transmitted thereto through a by-pass 58 connected however to the front contact 60 of a relay 59, in the example illustrated; this contact 60 should be closed only during the period of the sweep line selected as line of longitude $\lambda_a$, from which the transfer operation of function $\beta F_0$ along the streamlines of the velocity field $\vec{H}_\sigma$ is to begin.

Various means may be provided for making available to the operator the selective control of this longitude. In the example in question a counter 61 counts up the line sweep synchronizing pulses delivered by the generator 30. Therefore, it progresses one step forward at each beginning of a line.

Its indexing condition is decoded, not in position by indexing a particularized output (as the position of counter 33 is decoded) but the standard of decoding resistances is designed to deliver a voltage proportional to the counting position to a single output 62. Then this voltage is fed as a battery voltage to one of the pair of windings of relay 59 assembled as a differential relay and having its other winding connected to the battery through the medium of a potentiometer 63. Thus, the desired longitude value will be set on this potentiometer by means of the slider; the condition of relay 59 will change only in case the two voltages set on the longitude selecting potentiometer and delivered by the counter 61 are equal, provided that these two windings have the same number of ampereturns.

However, to increase the accuracy of operation it may be advantageous to dispense with the aforesaid potentiometer, and to establish the relay 59 with a single winding, provided that the synchronizing line counter 61 is designed with a predeterminable known form of counter, that is having means so adjustable that this counter will deliver an output signal after any number of lines counted thereby, from O to N, in which N is its maximum capacity equal to the number of vertical sweep lines per image; any output pulse of the counter will restore it to a counting-position of a value complementary to N of the rank of the desired longitudinal line, instead of resetting it, this number being indexed on the predetermining selector.

According to a further example the initial longitude of the transfer operation may be selected directly by displacing a mask on the diagram, or still by delivering a constant but adjustable de-framing voltage to a pair of additional deflection elements of tube 18, which voltage would be taken from a potentiometer of same character as the potentiometer 63 of the example illustrated.

Reverting now to this example, at the commencing of the sweep line as selected by the indexing of potentiometer 63, the relay 59 will be energized and its contact 60 closed, so that the voltage from the line sweep voltage generator 29 will be fed during a complete line scanning period to the relevant inputs of transfer gates 54-57. During the same line scanning period, a sequence of transfer control pulses will be fed from the corresponding gates 46 to 49, each pulse representing by its time position in this interval an ordinate value of the point of intersection of the streamline of field $\vec{H}_\sigma$ by the scanning spot. Thus, at each of these pulses the corresponding gate of the set 54-57 will apply to the input of the servo-mechanism 8 of same rank (Fig. 12) a recording signal of the ordinate value $\varphi$ as determined by the instantaneous amplitude of the sweep generator voltage received by the control grid of this transfer gate. Thus, the "sampled" values of the waveform period of the voltage from this generator—which represent through their amplitude the values $\varphi_1, \varphi_2, \ldots \varphi_n$ of the variable $\varphi$ will be recorded on the potentiometer 3 of the recorder by adjusting the sliders 5 during the scanning of this vertical line.

Of course, the counter 61 must be subsequently blocked during the remaining portion of the scanning of tubes 18 and 19; this may be accomplished by a mere resetting at each beginning of a sweep line resulting from the application of the vertical sweep synchronizing pulse which will then pass through a contact 89 of relay 59 before attaining the resetting input terminal of counter 61; this contact 89 is provided with means for locking it mechanically in its closed position.

Another contact 90, also provided with mechanical locking means, of relay 59 is adapted to close and subsequently, during the remaining sweep period, to hold closed the branch line 44 of transmission channel 32 for the pulses actuating the counter 33. Through this means given by way of illustration the gates 40 to 43 cannot deliver pulses before the scanning has reached the longitude from which the operation of transfer of function $\beta F_0$ is to take place.

Indeed, it is from this same sweep line of longitude $\lambda_a$ that the computation of the transfer time $t$ on each streamline of the velocity field $\vec{H}_\sigma$ must also commence. For this purpose the outputs of the transfer stages 40–43 are similarly connected through connections 64–67 to corresponding actuating inputs of bi-stable trigger circuits 68–71. Each bi-stable trigger circuit may consist of an assembly of two tubes coupled mutually through networks having a time constant between the plate and the control grid, the actuation for operativeness occurring for example by feeding a voltage to a control grid while the actuation for inoperativeness or initial condition occurs by applying a voltage to the other control grid of the assembly.

Each bi-stable trigger circuit has one plate output (for the high and low voltage indexing, on this output, of its operative and inoperative conditions) connected to the input of an integrating circuit 72–75 through the intermediary of a back contact 76–79 of a differential relay 80–83 of which one winding is fed with the output voltage of the respective integrator. The other winding of each of these relays is supplied with a biasing voltage from a common potentiometer 84. This potentiometer is intended for electrically indexing a predeterminable value of the transfer time $t$.

The bi-stable trigger circuits are furthermore interconnected through unidirectional switches indicated in the drawing by the reference numbers 85 to 88, so that the operativeness of any bi-stable trigger will cause the bi-stable trigger of preceding rank to become inoperative; of course, the bi-stable trigger of the last rank must be restored to its inoperative condition by a direct or delayed line synchronizing pulse. When, for instance, the first bi-stable trigger 68 has been brought to its operative condition by the first pulse produced in the channel 32 (through which the diagram $\vec{H}_\sigma$ is read) at the longitude corresponding to the transfer starting point, it will remain in this condition until the counter 33 has moved one step forward, thereby actuating the next bi-stable trigger 69 while restoring the first bi-stable trigger 68 to its inoperative or initial condition. Thus, the duration of the voltage applied by the bi-stable trigger 68 to the input of integrator 72 is proportional to the interval, in term of time, between the latitudes of the first two points A—A on the meridian $\lambda_a$ (Fig. 2). The integrator 72 has produced an output voltage proportional to this interval and holds same during the remaining portion of the sweep line. At the next vertical sweep line the procedure is resumed and, through accumulation and integration of the voltage pulses thus delivered from the first bi-stable trigger to its integrator, the output voltage of the latter will rise proportionally to the progressively scanned area between the two lower streamlines of the velocity field $\vec{H}_\sigma$. When the integrator output voltage attains and exceeds the biasing value fed from 84, relay 80 is energized and its contact 76 open, thereby interrupting the feeding of the integrator. As the biasing from 84 represents the desired transfer time $t$, the moment at which relay 80 operates corresponds to the moment at which the value of $\beta F_0$ must be measured and recorded. This value will then correspond to $\{\beta F_0\}_1$ on potentiometer $6^1$ of Fig. 12.

The same applies to each of the other transfer time determining channels along the streamlines of the velocity field $\vec{H}_\sigma$. It is clear however that as a rule the times of operation of the various relays 80–83 will not be coincident with each other, as the distances covered along the different streamlines of the velocity field $\vec{H}_\sigma$ for a given value of the transfer time will not result in a distribution of points B, Fig. 2, and C, Fig. 3, such as to correspond to a single scanning line.

The discrete values of the function $\beta F_0$ to be transferred are measured permanently as the diagrams are scanned and for each line of sweep thereof. Since the transmission to the recorder of the value of $\beta F_0$ is conditioned by means comprising in themselves the indexing of the original longitude, is is not necessary to provide for this measure a time origin other than the moment at which the scanning of the diagram begins.

The output channel 92 of amplifier 91 of the photo-cell device 23, through the representation in thin and thick lines as mentioned hereinabove, and during each vertical scanning line on the tube 19, carries a sequence of single pulses and double pulses. By means of a discriminator circuit 93 comprising an impulse discriminator 93', a pulse-delay 93'', and a trigger stage 93''' these pulses are switched according to their characterization (single or double) toward one of the two actuating channels 94 and 95 of a reversible counter 96 said counter is for instance of the type described by the Staff of Engineering Research Associates Inc. in High-Speed Computing Devices—McGraw Hill Book Company, Inc., first edition 1950, chapter 3—3, at page 16 (lines 10–18), and page 17 (lines 1–4) and represented at Figures 3—3, page 16; for example, any pulse in channel 94 will effect one counting or forward step of counter 96, and any pulse in channel 95 will then cause one de-counting or backward step of the same counter 96 the resetting of which is determined by the line synchronizing pulses from generator 30.

The selection and orientation of the single and double pulses may occur for example in the manner in which these operations take place in certain pulse modulation transmission systems, the pilot pulses of which are double to differentiate them from intelligence pulses which are simple ones; any pulse entering the discriminator circuit 93 is applied on the one hand directly and with a certain time-delay (at least equal to the interval between two double pulse elements) to a threshold stage, whereby the latter will deliver an output signal only in case of an incoming double pulse; any incoming pulse on the other hand is applied with the same time-delay to a stage without threshold but adapted to be blocked by the threshold stage each time the former delivers an output pulse.

Thus, the respective outputs of this discriminator constitute the separate channels through which the reversible counter 96 can be actuated. This counter may be replaced if desired by a pair of separate counters of which the outputs, decoded in voltage value, would then put in opposition.

In the example considered there the decoding of the indications of counter 96 is effected by as many resistor net-works—in this case 97 to 100—as there are channels for sampling the values of the function $\beta F_0$ (from $(\beta F_0)_1$ to $(\beta F_0)_n$. Each decoding network output is connected separately to a contact (101 to 104) of relays 80–83. This contact remains closed as long as the relevant relay is not energized by the equalizing of its biasing voltage and its input voltage from the integrator of the corresponding channel for measuring the transfer time. On the other hand, each contact 101 to 104 is connected to an input terminal 11 of the servomechanism controlling the position of a slider 6 (Fig. 12).

During the scanning of the diagram of Fig. 3 at each sweep line the decoded voltages of counter 96 will therefore vary together with the variation of the function $\beta F_0$ on this line, and consequently the positions of sliders 6 are constantly changed by the servomechanisms fed with these voltages. However, as soon as one of the integrator output relays becomes operative (the transfer being completed on this channel since the transfer time along the corresponding streamline of field $\vec{H}_\sigma$ has become equal to $t$), the contact is broken between the decoded counter output and the input 11 of the servomechanism of same rank. As an additional contact 105–108 (Fig. 13) is also provided for interrupting the supply of voltage to the potentiometer 15 of the servomechanism of corresponding rank at that moment, this servomechanism will come to a standstill in the position attained at the time when the contact-breaking has occurred and then the slider 6 will remain in this position indicating the value $\{\beta F_0\}$ of the transferred function.

Thus, when the diagram scanning spot passed on the starting longitude of the transfer, the discrete values of the independent variable $\varphi$ have been recorded; then, in correspondence therewith and in an order conditioned by the spatial structure of the velocity field $\vec{H}_\sigma$, after each transfer time $t$ along one streamline, the discrete value of function $\{\beta F_0\}$ which corresponds to the discrete value of the variable $\varphi$ is recorded, so that at the end of the transfer operation the representations of the discrete set $\{\beta F_0\}_j$, $\varphi_j$ characteristic of the transferred function, according to the method set forth at the beginning of this specification, are indeed available.

In the example described hereinabove the scanning of the diagrams by means of light-spot cathode ray devices is contemplated. It is obvious that alternately the pictures of both graphical representations could be projected on the photocathodes of two conventional television scanning devices the signal-plates of which would then deliver their signals to the transmission channels 32 and 92 respectively. According to a further alternate form of embodiment, if the scanning velocity may be still lower (in the above-described embodiment it must of course be consistent with the response time of the recording servomechanisms), both graphical representations, reproduced on transparent or opaque carriers, could also be scanned simultaneously by causing optical followers to be travelled thereacross in both line and picture, latitude and longitude directions. Obviously, the recording of the discrete values of the transferred function and of the variable $\varphi$ may be effected graphically from voltages representing these functions and values, for example by direct pricking on plan from positions of balance of the servomechanisms.

However, in addition to these alternate forms of embodiment of the invention which have been disclosed hereinabove, the following modifications may be brought to the computer, either separately or in any technically consistent combination:

(*a*) the diagram of the initial function is given in wash-drawing instead of outline-drawing, and the resulting variation in transparency (or reflexion) shows a direct amplitude variation of the output signal of photocell 25; then, the counter-decoder is no more necessary and on the contrary it will be sufficient directly to connect the channel 92 to the armatures of contacts 101–104;

(*b*) the datum of the function $\beta F_0$ to be transferred is replaced, in the scanning device 19 of Fig. 13, by the data of the level lines of the initial function log $\hat{\eta}_0$ occurring in Formula 6 hereinabove and of function $\beta$. In this case the decoder of counter 96 (or channel 92, if the above alternate form (*a*) is resorted to) is connected to the input of a special electronic computer for the function $F_0$ of log $\hat{\eta}_0$, according to Formula 6, and it is the output of this computer which is connected in multiple to the aforesaid contacts 101—104. For automatically computing $F_0$ by means of Formula 6 the latter is written in the equivalent form (16).

According to Formula 4 the values $\{\beta F_0\}$ of the transferred function $\beta F_0$, such as delivered by the portion of the apparatus which has just been described, must be multiplied by the weight function $G(\varphi_1\varphi_0)$ before undergoing the integration along a meridian. Therefore, one example of a multiplier associated with the above-described apparatus will be disclosed hereafter.

It is known that for obtaining through electrical means a voltage representing the product of two quantities of which one is given in the form of an electrical voltage, it will be sufficient to apply this latter voltage to the terminal of a potentiometer and to adjust the slider of this potentiometer so that it will indicate a transfer coefficient proportional to the value of the second quantity of the two: then the voltage taken from the slider of the potentiometer will be proportional to the value of the product of these two quantities.

Besides, it is already known to elaborate an electrical voltage representing a function of an independent variable for any value of this variable comprised between two predetermined limits. From the diagram of the function $G(\varphi_1\varphi_0)$ for $\varphi_1 \leq \varphi \leq \varphi_2$ two general methods may be adhered to obtain therefrom a reproduction in terms of electrical voltage: the first method consists in providing a mannual or automatic line follower, in disposing along the ordinate and abscissae axes, respectively, two potentiometers, the slider of the abscissa potentiometer being driven to simulate the variation of the independent variable $\varphi$ and actuating the line follower which through servoaction, moves along the curve representing the function to be reproduced electrically and simultaneously drives on the ordinate potentiometer the slider, the initial voltage of which simulates an electrical given variation of its independent variable; the other method consists in graphically splitting up the curve into component elements, preferably in segments or portions of straight lines the graphical summation of which makes it possible to reconstitute this curve and to provide a "function translator" consisting of as many voltage transfer linear networks as there are component elements, the outputs of these transfer networks being connected in common to the input of a summator-amplifier, while the inputs thereof are attacked from the slider of a potentiometer; to each displacement of this slider simulating the varation of the independent variable there will correspond, at the output of the summator-amplifier, a variation in electrical voltage which will simulate the corresponding variation in the function. In either of the devices broadly disclosed hereinbefore, it will be remarked that a direct means (the displacement of a slider along a potentiometer) is available for simulating any variation of the variable between two limits predetermined by the potentials applied at either end of the potentiometer, whereby an electrical voltage is obtained at the output of the device which simulates correspondingly the variation of the function.

Thus, by connecting (in parallel) potentiometers having separately adjustable sliders with the output of a device of the kind described, it becomes possible, when these sliders are adjusted for indicating a discrete set of values of a second quantity, to obtain a plurality of electrical voltages each representing the product of any value of the first quantity by a particularized value of the second quantity. However, with this specific arrangement it is not possible to obtain an electrical voltage representing the product of two functions for any value of their common independent variable.

To achieve this end and in accordance with the teachings of the present invention, to provide an electronic multiplier adapted to comply with the requirements set forth hereinabove, the sliders of the potentiometers connected in parallel with the output of the arbitrary function generator—or translator—are then connected separately with as many adjustable tappings of a single potentiometer, homologous to the potentiometer simulating the independent variable $\varphi$ of the function $G(\varphi_1\varphi_0)$, and the two sliders of these potentiometers are also mechanically coupled in order to render their displacements homologous or synchronized. As the discrete sets of values $\{\beta F_0\}_j$, $\varphi_j$, given for defining the second function $\{\beta F_0\}$ are then indicated by the sliders of the aforementioned potentiometers and by their adjustable tappings on the single potentiometer, a voltage develops on the slider of this potentiometer which actually represents the value of the product of said two quantities for a common value of their independent variable, such as defined by the interlocked positions of the two sliders simulating this variable. It can be said that indeed in this arrangement according to the invention the single potentiometer from which the product voltage is derived is used for interpolating the value of this product between each pair of values of the independent variable $\varphi$ as indicated on this single potentiometer.

The weight function G' can be determined in two ways. As shown in Figs. 7 and 11, and described above, G' can be generated continuously. Optionally, as shown in Fig. 14, G' can be generated discontinuously. This method consists in an automatic setting of discrete values of G', a linear interpolation being operated between said discrete values.

Fig. 14 shows diagrammatically an example, given merely for illustrative purposes, of a translator of function $G(\varphi,\varphi_0)$I, and of an electronic multiplier II according to the invention characterized more particularly in that the structure proper of the translator of function $G(\varphi_1\varphi_0)$ is by no means limiting as far as the characteristics set forth hereinabove are concerned. Of course, this translator of the function of two variables $\varphi$, $\varphi_0$ may consist indifferently of a single unit as already described with reference to the first embodiment of the invention, or of the assembly of a certain number of translators of the functions of a single variable:

$$G_1(\varphi) \text{ for } \varphi_0 = \varphi_{01}$$
$$G_2(\varphi) \text{ for } \varphi_0 = \varphi_{02}$$
$$\overline{G_n(\varphi) \text{ for } \varphi_0 = \varphi_{0n}}$$

The example shown in Fig. 14 illustrates the specific case wherein a plurality of translators are utilized. For the sake of clarity in the disclosure and to avoid any intricacy in the diagrams, that portion of the circuits—already known per se—which makes it possible to indicate, for the set of translators and for each operation, the value of the variable $\varphi_0$ and to effect an interpolation between the different functions $G_i(\varphi)$ has been purposely omitted. All the circuits, which added to the output 220 of Fig. 14, make it possible to calculate the integral of Formula (4) once the product $G\{\beta F_0\}$ has been determined, as well as the circuits designed to convert the values $\log_p$ of this integral into values of $p$ to be applied to the final recorder, are also omitted from this figure, for the reason that they have already been described with reference to the first embodiment of the invention.

Fig. 14 shows only the translator of one of the functions $G_i(\varphi)$ designated as a unit by the reference letter I. Its essential structural feature is that it comprises a potentiometer 201 for simulating the variable $\varphi$ common to both functions $\{\beta F_0\}$ and G by means of a slider 204. Said slider is moved by the servo-system fed by the generator of $\alpha$ and designated as "rotational transformer of $\alpha$" on Figure 6. Indeed it must not be forgotten that the variations in the variable $\varphi$ are proportional to the variations in the variable $\alpha$, so that the same device may be used for the rotational transforming of the variable $\alpha$ and of the variable $\varphi$. Said servo-system is not reproduced on Figure 14. This potentiometer 201 may receive for example across its terminals 202 and 203 a potential difference V and, still more particularly, its terminal 202 may be grounded while its terminal 203 is fed with the reference voltage $+V$.

Thus, for any position of slider 204, the potentiometer 201 will apply to the input 205 of one of the translators of the function $G(\varphi_1\varphi_0)$ [in this case a fully electronic function translator], a particularized voltage comprised between 0 and V. To any specific value of the input voltage fed to 205 there corresponds an output voltage representing in either polarity the corresponding value of function G, for example in negative polarity on terminal 206 and positive polarity on terminal 207.

The output terminal 206 of the translator of $G(\varphi_1\varphi_0)$ is connected to a feeder 208, and the terminal 207 is connected to another feeder 209 so that terminals 206 and 207 constitute the inputs of the multiplier II. Across these feeders 208 and 209 are arranged a number of potentiometers 210, ranging from $210^1$ to $210^n$, which is equal to the number of discrete values ($\{\beta F_0\}_j$, $\varphi_j$) to be indicated. Due to the balancing of the potentials of opposite polarities on feeders 208 and 209, these potentiometers 210 could be simply arranged to bridge the feeders. However, to improve the safety of the arrangements these potentiometers are shown with one end terminal grounded and the other end terminal connected to the armature of an inverter 211, the contacts of which are connected to feeders 208 and 209 respectively. These armatures also have a neutral position. Thus, it becomes possible to use potentiometers for indicating the values $\{\beta F_0\}_1$, $\{\beta F_0\}_2$; ... $\{\beta F_0\}_n$ in magnitude and in sign.

The values of $\{\beta F_0\}$ are set by means of sliders 212 on potentiometers 210 and, through direct connections 213, these sliders are connected separately to adjustable tappings 214 whereby the corresponding values of the variable $\varphi(\varphi_1, \varphi_2, \ldots \varphi_n)$ can be shown on the interpolation potentiometer 215 said values of $\{\beta F_0\}$ are taken for instance from the potentiometers $5^1$, $5^2$, ... $5^4$, shown on Figure 12 by connecting directly each potentiometer 5 with one potentiometer 212. (In this case an interpolation between the discrete values $\{\beta F_0\}_1$ ... $\{\beta F_0\}_4$ is not to be performed by means of the potentiometer 3 of Figure 12 since an interpolation is performed by means of the potentiometer 215 of Figure 14.)

This interpolation potentiometer should be so designed as to be homologous to the potentiometer simulating the variable $\varphi$ (201). To simplify the disclosure and drawings both these potentiometers will be considered as constructionally identical and as receiving the same potentials at their end terminals. Terminal 216 of potentiometer 215 will therefore be grounded and its other terminal 217 will have the voltage $+V$. Its slider 218 will be coupled directly through a mechanical linkage 219 to the slider 204 of potentiometer 201, so that both these sliders will be displaced jointly by a single control action for simulating any variation in the variable $\varphi$.

The output voltage of the thus constituted multiplier is applied for example to the integrator 322 on Figure 9.

Now, if we consider the sliders of potentiometers 201 and 215 in such a position as to locate the slider 218 between two adjustable tappings 214, the latter defining for example the values $\varphi_j$ and $\varphi_{j+1}$ of the variable $\varphi$, the voltage collected on slider 218 (and therefore transferred to the output of the multiplier) represents a quantity which can be expressed as follows:

(19) $\quad G(\varphi_1\varphi_0)\{\beta F_0\}_j + \dfrac{\varphi - \varphi_j}{\varphi_{j+1} - \varphi_j}[\{\beta F_0\}_{j+1} - \{\beta F_0\}_j]$ expressing the actual linearly interpolated value of the product $G\{\beta F\}$ between the two values $G(\varphi_j,\varphi_0)\{\beta F_0\}_j$— when $\varphi = \varphi_j$ and $G(\varphi_{j+1},\varphi_0)\{\beta F_0\}_{j-1}$— when $\varphi = \varphi_{j+1}$.

Of course, for this interpolation to be linear, the potentiometers 201 and 215 must themselves have linear characteristic. Another law of interpolation may be applied if desired by designing these potentiometers directly for simulating this law along their paths by means of the coupled sliders 204 and 218. In other words, these potentiometers could be designed to simulate any desired law of the variable $\varphi$ in terms of the distance at one end of the potentiometers.

However, on the other hand and considering the fact that it will be probably more convenient in the practice to maintain a linear law of setting of the variable on both potentiometers, any desired interpolation law may be effected, if necessary, by interposing between slider 218 and terminal 221 and (or) between slider 204 and terminal 205, an additional function translator indicating this interpolation law.

The arbitrary function translator illustrated in the diagram is of a known type permitting the practical application of the second of the two methods disclosed hereabove for elaborating an electrical voltage simulating a graphically defined function. The input terminal 205, to which the independent variable voltage derived from the potentiometer 201 is applied, is connected to a unit-gain (—) amplifier stage 223, applying in turn this voltage with a reverse, in this case negative, polarity to a feeder 222. The output of this stage 223 is also connected to another unit-gain (—) amplifier stage 224 whereby the same voltage value is applied to a feeder 225 with a reverse, in this case positive, polarity. Each feeder supplies a certain number of transfer networks, each comprising a potentiometer 226 the slider 227 of which is connected through the medium of a pair of series-connected resistors (228 and 229) to the input 230 of a summator amplifier stage 231. At the connecting point between resistors 228 and 229 there is branched off a voltage-limiting device incorporating for example a diode 232. The electrode of this diode which is not connected to the transfer network is biased to make this diode conductive and therefore restricts the output potential of the network to a predetermined value of the voltage derived from potentiometer 226. The direction of connection of each diode is dependent of course on the polarity of the incoming signal. It will be readily understood that the transfer characteristic of each network is therefore constituted by a straight line segment extending from the origin with an inclination determined by the setting of potentiometer 226 and, from the point where the input voltage exceeds the limiting value set at 233, this characteristic becomes parallel to the abscissa axis. For a continuous variation in the input voltage from the said origin, the output voltage of each network at 230 will therefore show a linear increase up to a value at which it will stabilize itself for an individually predetermined value of the input voltage.

The summator stage 231 ensures the algebraic summation of the whole of the output voltages of these networks and delivers a signal representing the function displayed on the networks of the arbitrary function translator, this signal being applied directly to the terminal 206 of feeder 208 and also to the input 234 of a polarity inversor stage 235 which is an amplifier with gain (—1) the output of which is connected to the terminal 207 of feeder 209. Thus, both feeders 208 and 209 are always fed with voltages of same modulus but of opposite polarities. Of course, a polarity selecting device, consisting for example of a diode network, may be provided between the outputs of the two stages 231 and 235 on the one hand and terminals 206 and 207 on the other hand, so that both feeders 208 and 209 will constantly receive the voltage of their polarity assignment which is negative on feeder 208 and positive on feeder 209, in order accurately to define the sign indication on potentiometers 210. There is no need of further illustrating the design and operation of a polarity selecting device of this type as it consists in connecting to each output of stages 231 and 235 the two diodes having reciprocal directions of conductivity, one diode connecting to terminal 205 the output of the stage concerned and the other to terminal 207.

Of course, the invention is not limited to the specific forms of embodiment shown in the drawings and described hereinabove as these are given merely by way of example.

What we claim is:

1. Apparatus for determining or forecasting what the value will be at a given point after a given interval of time, of a meteorological parameter such as atmospheric pressure, temperature, wind, defined by the fact that it satisfies Equation 1

$$\frac{\partial p}{\partial t} = -\vec{H}_\sigma \cdot \nabla_h p + \vec{\Lambda} \cdot \nabla_h \left(\frac{\partial p}{\partial t}\right)$$

with the following symbols:

$p$=unknown space and time function to be determined
$t$=time
$\vec{H}_\sigma$=transfer velocity vector
$\vec{\Lambda}$=vector having the dimension of a length
$\nabla_h$=two-dimensional operator from a chart of mean isotherm lines and a chart of isolines indicating the initial condition of the functions of the said parameter given by Equation 6

$$F_0 = \log \hat{p}_0 - \frac{r}{K} \cotg \varphi \frac{\partial \log \hat{p}_0}{\partial N}$$

with the following symbols:

$\hat{p}_0$=initial value of function $p$ possibly increased by a constant in order to render this function positive everywhere
$r$=mean radius of the earth
$\varphi$=geographical latitude
$K$=absolute constant
$N$=length measured on the meridians towards north which comprises: (a) means for scanning said chart of mean isotherm lines along meridians commencing with a datum meridian containing or lying closely adjacent to said given point and proceeding along successive meridians lying in an upstream direction from the datum meridian until an area has been scanned proportional to the said interval of time (due allowance being made for any correction rendered necessary by a variation in the scale of the chart along the meridians), said area lying between a pair of isotherm lines (of which one runs through or lies closely adjacent to said given point) the datum meridian and a further meridian lying in an upstream direction from the datum meridian; (b) means for scanning said chart of isolines along meridians commencing with a datum meridian containing or lying closely adjacent to said given point and proceeding along successive meridians lying in an upstream direction from the datum meridian; (c) electrical means for counting algebraically the isolines along each scanning line of said chart of isolines to determine at each moment of the said count the value of the said function for the position attained by the scanning means, and so obtaining a voltage representing the value of the said function at a point on the said further meridian (mentioned under (a) above) and either on one isotherm line of the said pair of isotherm lines or between the pair of isotherm lines; (d) electrical means for multiplying this value of the said function by a weight function as defined by Equation 5

$$G(\varphi_1 \varphi_0) = K \tg \varphi \left(\frac{\cos \varphi}{\cos \varphi_0}\right)^K$$

with: $\varphi_0$=latitude of the point considered to produce a voltage representing a product value; (e) means for performing the operations referred to under (a) to (d) above in relation to further pairs of isotherm lines towards the geographical pole from the first pair of isotherm lines; and (f) means for electrically integrating all the product values thus obtained.

2. Apparatus for determining or forecasting what the value will be, at a given point after a given interval of time, of a meteorological parameter such as atmospheric pressure, temperature, wind, defined by the fact that it satisfies Equation 1

$$\frac{\partial p}{\partial t} = -\vec{H}_\sigma . \nabla_h p + \vec{\Lambda} . \nabla_h \left(\frac{\partial p}{\partial t}\right)$$

with the following symbols:

$p$=unknown space and time function to be determined
$t$=time
$\vec{H}_\sigma$=transfer velocity vector
$\vec{\Lambda}$=vector having the dimension of a length
$\nabla_h$=two-dimensional operator from a chart of mean isotherm lines and a chart of isolines indicating the initial condition of the said parameter or its logarithm which comprises: (a) means for scanning said chart of mean isotherm lines along meridians commencing with a datum meridian containing or lying closely adjacent to said given point and proceeding along successive meridians lying in an upstream direction from the datum meridian until an area has been scanned proportional to the said interval of time (due allowance being made for any correction rendered necessary by a variation in the scale of the chart along the meridians), said area lying between a pair of isotherm lines (of which one runs through or lies closely adjacent to said given point) the datum meridian and a further meridian lying in an upstream direction from the datum meridian; (b) means for scanning said chart of isolines along meridians commencing with a datum meridian containing or lying closely adjacent to said given point and proceeding along successive meridians lying in an upstream direction from the datum meridian; (c) electrical means for counting algebraically the isolines along each scanning line of said chart of isolines to determine at each moment of the said count the value of the said parameter or its logarithm for the position attained by the scanning means, and so obtaining a voltage representing the value of the said parameter or its logarithm at a point on the said further meridian (mentioned under (a) above) and either on one isotherm line of the said pair of isotherm lines or between the pair of isotherm lines; (d) electrical means for computing from this value the value of the function of the said parameter given by the Equation 6

$$F_0 = \log \hat{p}_0 - \frac{r}{K} \cotg \varphi \frac{\partial \log \hat{p}_0}{\partial N}$$

with the following symbols:

$\hat{p}_0$=initial value of function $p$ possibly increased by a constant in order to render this function positive everywhere
$r$=mean radius of the earth
$\varphi$=geographical latitude
$K$=absolute constant
$N$=length measured on the meridians towards north and for multiplying the value of $F_0$ by a weight function as defined by Equation 5

$$G(\varphi_1 \varphi_0) = K \, tg \, \varphi \left(\frac{\cos \varphi}{\cos \varphi_0}\right)^K$$

with: $\varphi_0$ latitude of the point considered, to produce a voltage representing a product value; (e) means for performing the operation referred to under (a) to (d) above in relation to further pairs of isotherm lines towards the geographical pole from the first pair of isotherm lines; and (f) means for electrically integrating all the products value thus obtained.

3. An apparatus according to claim 1 comprising in combination means for engendering at each scanning line a voltage linked to the variation in magnitude of $\varphi$ latitude along this line, other means for sampling this voltage by the indexing pulses along a particularized line of scanning; means for recording these sampled voltages, in order to produce (starting from this particularized line) in separate channels and under the control of the aforesaid indexing pulses, electrical voltages representative of the variations in the transfer time along the respective streamlines of the field; and means for recording in each channel the value of the voltage representing the function $\beta F_0$ which depends upon $p_0$ and is to undergo the transfer operation along the said streamlines, when the voltage produced in this channel attains a value corresponding to the predetermined transfer time of the operation in progress.

4. An apparatus according to claim 1 wherein a first portion of the apparatus comprises, in combination, a pair of map scanning devices, the scanning line of which is coincident with the direction of the meridians; a generator providing an electrical voltage varying with the variation in latitude and means for linking the variation of this voltage to the line scanning voltage of said scanning devices; other means, in one of the scanning devices, for delivering at each scanning line of the diagram of $\vec{H}_\sigma$ a series of electrical pulses indicating the moments at which this scanning line intersects the streamlines of $\vec{H}_\sigma$ and for cyclically distributing these indicating pulses on the one hand to a plurality of gates receiving in common the latitude voltage, and on the other hand to the inputs of a plurality of channels for computing the transfer line along the streamlines of $\vec{H}_\sigma$; two sets of recorders after said gates the elements of said recorders being coupled in correspondence with the indicating pulses; means for selecting in one of said scanning devices a transfer starting line of scanning and for controlling in this scanning line the selective unlocking of said gates toward the recorders of the first set and also for controlling from this scanning line the formation in each of said computing channels of a voltage developing according to a law connected to the variation of the time of transfer along the relevant streamline of $\vec{H}_\sigma$; means, in the other of said scanning devices, for delivering to each scanning line a voltage connected to the variation of $\beta F_0$, the diagram of which is scanned by this scanning device, and also for applying this voltage to a plurality of voltage transfer members so as to transfer it to the recorders of the second set; means, in each of the aforesaid computing channels, for comparing the developed voltage with a reference voltage of the transfer time; and means for selectively controlling, up to the equality between the voltage developed in each channel and the reference voltage, the transfer to a recorder of the second set of the voltage linked to $\beta F_0$, then applied to the input of the relevant transfer member.

5. An apparatus according to claim 1 wherein a device is provided for determining the moment when the integration of the transfer time (scanning of the isotherms) is beginning, this determination occurring by the value of the abscissa of the point where the forecast is desired considered on the map of the said streamlines.

6. An apparatus according to claim 5 comprising, a counter of the pulses created by the passage (along the meridians) of a scanning spot on the transfer lines (map of mean isotherm lines), a computer of the transfer time on each transfer line by determining the areas comprised between the successive transfer lines and the scanning lines from the line $\lambda = \lambda_a$ ($\lambda_a$ being the arbitrary value of the longitude), a recorder of the latitudes $\varphi_1, \varphi_2, \ldots \varphi_n$ of the points of intersection between the transfer lines and the scanning line $\lambda = \lambda_a$; and a relay adapted to start said counter for $\lambda = \lambda_a$, a continuous computer of an initial function $$F_0 = \log \hat{p}_0 - \frac{r}{k} \cotg \varphi \frac{\partial \log p_0}{\partial N}$$

at any time during the scanning of the said level lines, and a connection between the two aforesaid computers for isolating each servomechanism for recording the value {F₀} of the transferred function F₀ when the transfer time of the corresponding transfer line attains a predetermined arbitrary value.

7. An apparatus according to claim 6 comprising devices such as gates adapted to receive the pulses from the counters depending on the scanning of the said streamlines ($\vec{H}_\sigma$) and an independent source of electric current producing voltages which are proportional to the values of the ordinates $\varphi$ of the diagram of lines $H_\sigma$ also connected to said gates.

8. An apparatus according to claim 6 comprising means for electro-optically scanning by means of a cathode ray tube the level lines of the initial function log $\hat{p}_0$ instead of the level lines of the function $F_0$, and means for electronically calculating from this scanning the corresponding values of the function $F_0$ of log $\hat{p}_0$.

9. An apparatus according to claim 1 comprising an electronic computer to calculate automatically the product of the weight function $G(\varphi, \varphi_0)$ by $\{\beta F_0\}$, i.e. by the transferred function $\beta F_0$, $\beta$ being a nonanalycity factor.

10. An apparatus according to claim 8 wherein the said computer comprises a generator of the weight function $G(\varphi, \varphi_0)$ a multiplier of this function by the set of values $\{\beta F_0\}_1, \{\beta F_0\}_2 \ldots \{\beta F_0\}_n$ of $\{\beta F_0\}$ which correspond to the different transfer lines scanned, and an interpolator between the products $[G\{\beta F_0\}](\varphi_j)$ and $[G\{\beta F_0\}](\varphi_{j+1})$ delivering the product $[G\{\beta F_0\}](\varphi)$ for any value of $\varphi$.

11. An apparatus according to claim 9 comprising electronic means for automatically computing the integral $$\int_{\varphi_0}^{\pi/2} G(\varphi,\varphi_0)\frac{1}{\beta}\{\beta F_0\}(\varphi,\lambda,t)d\varphi$$

12. An apparatus according to claim 1 comprising a comparator situated after the first scanning device receiving the pulses thus generated and blocking the set until the transfer time has attained the value preset therein.

13. An apparatus according to claim 12 comprising a line counter and a space counter receiving the pulses generated by the electrooptical scanning of the level curves and a computor of $F_0$ connected together with the aforesaid comparator of the transfer times to the said counters.

14. An apparatus according to claim 12 comprising a third electrooptical scanning device synchronous with the former, this scanning concerning the map representing iso-$\beta$ lines, a pulse counter after this device and further a decoder and a multiplier of $\beta$ by $F_0$.

15. An apparatus according to claim 13 comprising a recorder and deliverer of data concerning a limited number of transfer lines, values ($\varphi_j$ of $\varphi$) ranging for example from 1 to 6 and defined by the intersections of these transfer lines with the meridian $\lambda_a$.

16. An apparatus according to claim 12 further comprising a generator of the variable $\theta$ (scanning time), another generator for the horizontal scanning voltage $V_H$ and also a translator for the function $V(\theta)$ (vertical scanning voltage).

17. An apparatus according to claim 12 also comprising a comparator of the values of the longitude $\lambda$ to the longitude $\lambda_a$ of the forecast point.

18. An apparatus according to claim 13 comprising a generator of the variable $\alpha = \varphi - \varphi_0$, a transformer followed by a translator giving the value of the weight factor $G'(\alpha_1\varphi_0)$, a multiplier receiving the value $G^1$ and, the value $\{\beta F_0\}_j$ (wherein $j$ may vary for example from 1 to 6 or 7), this multiplier being followed, preferably, by an interpolator in which the values of $\alpha_j$ and the intervals $\alpha_{j+1} - \alpha_j$ are set by hand, and an integrator delivering:

$$I(\varphi_0) = k\int_0^{\pi/2-\varphi_0} \frac{1}{\beta}\{\beta F_0\}G^1(\alpha_1\varphi_0)d\alpha$$

19. An apparatus according to claim 13, further comprising a comparator of the values $\alpha_j$ and adapted to block the set when $\alpha$ equals one of the preset values.

20. An apparatus according to claim 18 wherein the generator of the variable $\alpha$ consists of a generator with a time-constant RC delivering a voltage $$\alpha = \mu\left(\frac{t}{RC}\right)$$

21. An apparatus according to claim 20 wherein the generator of $\alpha$ delivers a voltage proportional to $\alpha$ as the input to two functions translators, delivering the one sin $\alpha$, the other cos $\alpha$, said function translators supplying a multiplier delivering the product $tg\ \varphi_0 \sin\alpha$ and a subtractor delivering $\cos\alpha - tg\ \varphi_0 \sin\alpha$, said substractor supplying in turn a further function translator delivering $(\cos\alpha - tg\ \varphi_0 \sin\alpha)^K$, the latter supplying finally a further multiplier delivering the product $$tg\ \varphi(\cos\alpha - tg\ \varphi_0 \sin\alpha)^K$$

defining $G'(\alpha, \varphi_0)$.

22. Apparatus according to claim 18 comprising means for setting the values $B_j(\varphi_j,\lambda_a)$ of the function $\beta(\varphi_1\lambda)$ also called non-analyticity factor, by which the products $\{\beta F_0\}$ are divided.

23. Apparatus according to claim 18 wherein the computer of I and p comprises an interpolator consisting of a multiplier receiving the values G' and $\{\beta F_0\}$, a divider receiving the product $G'\{\beta F_0\}$ and dividing it by $\beta_j$, a multiplier delivering the product $$\frac{G\{\beta F_0\}}{\beta_j(\varphi_{j+1}-\varphi_j)}$$

and another element giving the product of these quantities by $\varphi - \varphi_j$ or by $\alpha - \alpha_j$.

24. Apparatus according to claim 18 comprising a translator for carrying out the operation $$p = \log^{-1}[I_i(\varphi_0)] - a\ \text{constant}.$$

25. Apparatus according to claim 18 provided with a servomechanism reproducing $\alpha$ by the angle of rotation of the shaft of the corresponding motor.

References Cited in the file of this patent

UNITED STATES PATENTS

| | | |
|---|---|---|
| 2,436,178 | Rajchman | Feb. 17, 1948 |
| 2,679,636 | Hillyer | May 25, 1954 |

FOREIGN PATENTS

| | | |
|---|---|---|
| 164,765 | Great Britain | June 23, 1921 |